(12) United States Patent
Li et al.

(10) Patent No.: US 12,034,176 B2
(45) Date of Patent: Jul. 9, 2024

(54) BATTERY, APPARATUS, AND PREPARATION METHOD AND PREPARATION APPARATUS OF BATTERY

(71) Applicant: CONTEMPORARY AMPEREX TECHNOLOGY CO., LIMITED, Ningde (CN)

(72) Inventors: Quanguo Li, Ningde (CN); Yonghuang Ye, Ningde (CN); Haizu Jin, Ningde (CN); Chengdu Liang, Ningde (CN); Qian Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/054,375

(22) Filed: Nov. 10, 2022

(65) Prior Publication Data

US 2023/0231263 A1 Jul. 20, 2023

Related U.S. Application Data

(63) Continuation of application No. PCT/CN2020/119738, filed on Sep. 30, 2020.

(51) Int. Cl.
*H01M 50/358* (2021.01)
*H01M 10/6555* (2014.01)
(Continued)

(52) U.S. Cl.
CPC ..... *H01M 50/358* (2021.01); *H01M 10/6555* (2015.04); *H01M 50/204* (2021.01);
(Continued)

(58) Field of Classification Search
CPC ........... H01M 10/647; H01M 10/6555; H01M 10/6556; H01M 10/658; H01M 50/204;
(Continued)

(56) References Cited

U.S. PATENT DOCUMENTS

| 8,993,140 B2 | 3/2015 | Schiemann et al. |
| 9,083,065 B2 | 7/2015 | Carkner |

(Continued)

FOREIGN PATENT DOCUMENTS

| CN | 101262049 A | 9/2008 |
| CN | 101409369 A | 4/2009 |

(Continued)

OTHER PUBLICATIONS

The European Patent Office (EPO) Extended Search Report for EP Application No. 20955830.3 dated Mar. 30, 2023 8 Pages.

(Continued)

*Primary Examiner* — Lingwen R Zeng
(74) *Attorney, Agent, or Firm* — ANOVA LAW GROUP, PLLC

(57) ABSTRACT

This application provides a battery, an apparatus, and a manufacturing method and an apparatus of batteries, and relates to the field of energy storage technologies. The battery includes two battery cells and two discharge channels. The two battery cells each include a pressure relief mechanism, and the pressure relief mechanism is configured to be actuated when internal pressure or temperature in the battery cell reaches a threshold, to release the internal pressure. The two discharge channels are configured to collect emissions respectively from the corresponding battery cell when the pressure relief mechanism is actuated.

17 Claims, 11 Drawing Sheets

(51) Int. Cl.
*H01M 50/204* (2021.01)
*H01M 10/647* (2014.01)
*H01M 10/6556* (2014.01)
*H01M 10/658* (2014.01)
*H01M 50/209* (2021.01)
*H01M 50/342* (2021.01)
*H01M 50/35* (2021.01)
*H01M 50/375* (2021.01)

(52) U.S. Cl.
CPC ...... *H01M 10/647* (2015.04); *H01M 10/6556* (2015.04); *H01M 10/658* (2015.04); *H01M 50/209* (2021.01); *H01M 50/3425* (2021.01); *H01M 50/35* (2021.01); *H01M 50/375* (2021.01); *Y02E 60/10* (2013.01)

(58) Field of Classification Search
CPC .......... H01M 50/209; H01M 50/3425; H01M 50/35; H01M 50/358; H01M 50/375; Y02E 60/10
See application file for complete search history.

(56) References Cited

U.S. PATENT DOCUMENTS

| | | | |
|---|---|---|---|
| 9,799,873 B2 | 10/2017 | Kohlberger | |
| 9,882,197 B2 | 1/2018 | Wang et al. | |
| 10,128,528 B2 | 11/2018 | Zhang et al. | |
| 10,153,636 B1 | 12/2018 | Vander Lind et al. | |
| 10,177,423 B2 | 1/2019 | Heeg et al. | |
| 10,434,894 B2 | 10/2019 | Li et al. | |
| 10,587,001 B2 | 3/2020 | Park | |
| 10,673,103 B2 | 6/2020 | Hoshina et al. | |
| 10,907,981 B2 | 2/2021 | Li et al. | |
| 2003/0068557 A1 | 4/2003 | Kumashiro et al. | |
| 2006/0197496 A1 | 9/2006 | Iijima et al. | |
| 2007/0072059 A1 | 3/2007 | Kitao et al. | |
| 2008/0067972 A1 | 3/2008 | Takami et al. | |
| 2008/0241666 A1 | 10/2008 | Baba et al. | |
| 2009/0162751 A1 | 6/2009 | Honbo et al. | |
| 2010/0136391 A1 | 6/2010 | Prilutsky et al. | |
| 2010/0304206 A1 | 12/2010 | Nakashima et al. | |
| 2011/0086248 A1 | 4/2011 | Nakura | |
| 2012/0074894 A1 | 3/2012 | Chen et al. | |
| 2012/0126753 A1 | 5/2012 | Carkner | |
| 2012/0164490 A1* | 6/2012 | Itoi | H01M 50/358 429/82 |
| 2012/0189885 A1 | 7/2012 | Kishii et al. | |
| 2013/0089761 A1 | 4/2013 | Schiemann et al. | |
| 2013/0337310 A1 | 12/2013 | Omura et al. | |
| 2014/0020235 A1 | 1/2014 | Aramaki et al. | |
| 2014/0087227 A1 | 3/2014 | Shih et al. | |
| 2014/0181551 A1 | 6/2014 | Rahal-Arabi et al. | |
| 2014/0186659 A1* | 7/2014 | Dhar | B60L 50/62 429/9 |
| 2014/0342216 A1 | 11/2014 | Kohlberger | |
| 2015/0132625 A1 | 5/2015 | Miyata et al. | |
| 2015/0188188 A1 | 7/2015 | Zhang et al. | |
| 2015/0188207 A1 | 7/2015 | Son et al. | |
| 2015/0280276 A1 | 10/2015 | Lemke et al. | |
| 2015/0300538 A1 | 10/2015 | Al-Atat et al. | |
| 2015/0303444 A1 | 10/2015 | Wang et al. | |
| 2015/0357687 A1 | 12/2015 | Heeg et al. | |
| 2015/0357688 A1 | 12/2015 | Heeg et al. | |
| 2015/0372359 A1 | 12/2015 | Shih et al. | |
| 2016/0099451 A1 | 4/2016 | Murai et al. | |
| 2016/0126546 A1 | 5/2016 | Takami et al. | |
| 2016/0200214 A1 | 7/2016 | Ishibashi et al. | |
| 2016/0301045 A1 | 10/2016 | Tyler et al. | |
| 2016/0301046 A1 | 10/2016 | Tyler et al. | |
| 2016/0301117 A1 | 10/2016 | Tyler et al. | |
| 2016/0329617 A1 | 11/2016 | Omura et al. | |
| 2016/0380315 A1 | 12/2016 | Weicker et al. | |
| 2017/0179535 A1 | 6/2017 | Murashi et al. | |
| 2017/0346089 A1 | 11/2017 | Yamamoto et al. | |
| 2017/0365886 A1 | 12/2017 | Hoshina et al. | |
| 2018/0034023 A1 | 2/2018 | Newman et al. | |
| 2018/0138478 A1 | 5/2018 | Chan | |
| 2018/0145383 A1 | 5/2018 | Krishnan et al. | |
| 2018/0159101 A1 | 6/2018 | Tsang et al. | |
| 2018/0212458 A1 | 7/2018 | Kawai et al. | |
| 2018/0217218 A1 | 8/2018 | Huang et al. | |
| 2019/0067658 A1 | 2/2019 | Fujiwara et al. | |
| 2019/0074560 A1 | 3/2019 | Reimer et al. | |
| 2019/0103625 A1 | 4/2019 | Haraguchi et al. | |
| 2019/0157636 A1* | 5/2019 | Miler | H01M 50/30 |
| 2019/0225093 A1 | 7/2019 | Li et al. | |
| 2019/0226859 A1 | 7/2019 | Li et al. | |
| 2019/0267686 A1 | 8/2019 | Shimizu et al. | |
| 2019/0334143 A1 | 10/2019 | Sugeno | |
| 2019/0386269 A1 | 12/2019 | Tyler et al. | |
| 2020/0014000 A1 | 1/2020 | Roddy et al. | |
| 2020/0058968 A1 | 2/2020 | Thompson et al. | |
| 2020/0106126 A1 | 4/2020 | Yokoshima et al. | |
| 2020/0130511 A1 | 4/2020 | Botts et al. | |
| 2020/0212526 A1 | 7/2020 | Wu et al. | |
| 2020/0295325 A1 | 9/2020 | Tyler et al. | |
| 2020/0313255 A1 | 10/2020 | Wu et al. | |
| 2020/0321568 A1 | 10/2020 | Roddy et al. | |
| 2021/0025723 A1 | 1/2021 | Li et al. | |
| 2021/0050635 A1 | 2/2021 | Lee et al. | |
| 2021/0074979 A1 | 3/2021 | Kwak et al. | |
| 2021/0091428 A1 | 3/2021 | Naito et al. | |
| 2021/0104798 A1 | 4/2021 | Jiang et al. | |
| 2021/0104801 A1 | 4/2021 | Chu et al. | |
| 2021/0296721 A1 | 9/2021 | Omura et al. | |
| 2021/0328281 A1* | 10/2021 | Chu | H01M 10/52 |
| 2021/0391619 A1 | 12/2021 | Chang et al. | |
| 2021/0391628 A1 | 12/2021 | Hattendorff et al. | |
| 2022/0069406 A1 | 3/2022 | Roddy et al. | |
| 2022/0123375 A1 | 4/2022 | Liang et al. | |
| 2022/0123427 A1 | 4/2022 | Ren et al. | |
| 2022/0320650 A1 | 10/2022 | Tyler et al. | |
| 2022/0416330 A1 | 12/2022 | Li et al. | |
| 2023/0061760 A1 | 3/2023 | Li et al. | |
| 2023/0070894 A1 | 3/2023 | Li et al. | |
| 2023/0076751 A1 | 3/2023 | Xu et al. | |
| 2023/0163296 A1 | 5/2023 | Li et al. | |
| 2023/0187756 A1 | 6/2023 | Chu et al. | |

FOREIGN PATENT DOCUMENTS

| | | |
|---|---|---|
| CN | 101504977 A | 8/2009 |
| CN | 101635372 A | 1/2010 |
| CN | 101675555 A | 3/2010 |
| CN | 201749897 U | 2/2011 |
| CN | 102027617 A | 4/2011 |
| CN | 102447301 A | 5/2012 |
| CN | 202308227 U | 7/2012 |
| CN | 101242011 B | 9/2012 |
| CN | 103311562 A | 9/2013 |
| CN | 104126238 A | 10/2014 |
| CN | 104979503 A | 10/2015 |
| CN | 105006586 A | 10/2015 |
| CN | 105186066 A | 12/2015 |
| CN | 105849968 A | 8/2016 |
| CN | 105914804 A | 8/2016 |
| CN | 106207016 A | 12/2016 |
| CN | 206225503 U | 6/2017 |
| CN | 107004920 A | 8/2017 |
| CN | 107112603 A | 8/2017 |
| CN | 107256971 A | 10/2017 |
| CN | 206567773 U | 10/2017 |
| CN | 108598598 A | 9/2018 |
| CN | 208507849 U | 2/2019 |
| CN | 109428114 A | 3/2019 |
| CN | 208674305 U | 3/2019 |
| CN | 109659465 A | 4/2019 |
| CN | 110048151 A | 7/2019 |
| CN | 110065414 A | 7/2019 |
| CN | 110071236 A | 7/2019 |
| CN | 209071461 U | 7/2019 |
| CN | 110265591 A | 9/2019 |

(56) References Cited

FOREIGN PATENT DOCUMENTS

| | | |
|---|---|---|
| CN | 110265627 A | 9/2019 |
| CN | 110380144 A | 10/2019 |
| CN | 110444835 A | 11/2019 |
| CN | 110456275 A | 11/2019 |
| CN | 110678393 A | 1/2020 |
| CN | 210040332 U | 2/2020 |
| CN | 210403875 U | 4/2020 |
| CN | 111106277 A | 5/2020 |
| CN | 111106278 A | 5/2020 |
| CN | 111446488 A | 7/2020 |
| CN | 111584792 A | 8/2020 |
| CN | 211295236 U | 8/2020 |
| CN | 111668408 A | 9/2020 |
| CN | 111668409 A | 9/2020 |
| CN | 211629259 U | 10/2020 |
| CN | 111900294 A | 11/2020 |
| CN | 213584016 U | 6/2021 |
| DE | 102012215495 A1 | 3/2014 |
| DE | 202017104111 U1 | 10/2018 |
| DE | 102017212223 A1 | 1/2019 |
| EP | 1265302 A2 | 12/2002 |
| EP | 3193402 A1 | 7/2017 |
| EP | 3261161 A1 | 12/2017 |
| EP | 3316391 A1 | 5/2018 |
| EP | 3358706 A1 | 8/2018 |
| EP | 3675218 A1 | 7/2020 |
| EP | 3926724 A2 | 12/2021 |
| JP | H07320775 A | 12/1995 |
| JP | H11121041 A | 4/1999 |
| JP | 2003174734 A | 6/2003 |
| JP | 2004342580 A | 12/2004 |
| JP | 2005071917 A | 3/2005 |
| JP | 2007059145 A | 3/2007 |
| JP | 2008226518 A | 9/2008 |
| JP | 2009021223 A | 1/2009 |
| JP | 2010250984 A | 11/2010 |
| JP | 2011065906 A | 3/2011 |
| JP | 2012113899 A | 6/2012 |
| JP | 2012234696 A | 11/2012 |
| JP | 2013509688 A | 3/2013 |
| JP | 2013209688 A | 10/2013 |
| JP | 2014072025 A | 4/2014 |
| JP | 2014112463 A | 6/2014 |
| JP | 2015018706 A | 1/2015 |
| JP | 2015133169 A | 7/2015 |
| JP | 2015170591 A | 9/2015 |
| JP | 2015530858 A | 10/2015 |
| JP | 2015204247 A | 11/2015 |
| JP | 2015211025 A | 11/2015 |
| JP | 2017139844 A | 8/2017 |
| JP | 2019129149 A | 8/2019 |
| JP | 2019139879 A | 8/2019 |
| JP | 2020035692 A | 3/2020 |
| JP | 2020527848 A | 9/2020 |
| JP | 2023509197 A | 3/2023 |
| JP | 2023509198 A | 3/2023 |
| WO | 2004095611 A1 | 11/2004 |
| WO | 2009113281 A1 | 9/2009 |
| WO | 2011114349 A2 | 9/2011 |
| WO | 2012014418 A1 | 2/2012 |
| WO | 2012060031 A1 | 5/2012 |
| WO | 2013031613 A1 | 3/2013 |
| WO | 2013069308 A1 | 5/2013 |
| WO | 2013099293 A1 | 7/2013 |
| WO | 2014045569 A1 | 3/2014 |
| WO | 2017191679 A1 | 11/2017 |
| WO | 2019123903 A1 | 6/2019 |
| WO | 2019161751 A1 | 8/2019 |
| WO | 2019187313 A1 | 10/2019 |
| WO | 2020053251 A1 | 3/2020 |
| WO | 2020133659 A1 | 7/2020 |
| WO | 2020133660 A1 | 7/2020 |
| WO | 2020134054 A1 | 7/2020 |
| WO | 2020135152 A1 | 7/2020 |
| WO | 2022067808 A1 | 4/2022 |
| WO | 2022067809 A1 | 4/2022 |
| WO | 2022067810 A1 | 4/2022 |

OTHER PUBLICATIONS

The World Intellectual Property Organization (WIPO) International Search Report and Written Opinion for PCT/CN2020/119737 dated Jul. 2, 2021 15 pages (including English translation).
The United States Patent and Trademark Office (USPTO) The office action for 17985813 dated Jun. 14, 2023 19 Pages.
The United States Patent and Trademark Office (USPTO) The office action for 17985813 dated Mar. 8, 2023 21 Pages.
The World Intellectual Property Organization (WIPO) International Search Report and Written Opinion for PCT/CN2020/129475 dated Aug. 16, 2021 13 pages (including English translation).
The United States Patent and Trademark Office (USPTO) The office action for 17985851 dated Mar. 22, 2023 13 Pages.
The World Intellectual Property Organization (WIPO) International Search Report and Written Opinion for PCT/CN2020/139180 dated Sep. 29, 2021 13 pages (including English translation).
The European Patent Office (EPO) Extended Search Report for EP Application No. 20947817.1 dated Nov. 30, 2022 7 Pages.
The World Intellectual Property Organization (WIPO) International Search Report and Written Opinion for PCT/CN2020/105474 dated Apr. 26, 2021 15 pages (including English translation).
Chengyi Lin et al., "General rules for analytical scanning electron microscopy", Jan. 23, 1997. JY/T 010-1996.
"Particle size analysis—Laser diffraction methods", Feb. 26, 2016. GB/T 19077-2016/ ISO 13320:2009.
The European Patent Office (EPO) Extended Search Report for EP Application No. 20947010.3 dated Jan. 25, 2023 9 Pages.
The China National Intellectual Property Administration (CNIPA) The First Office Action for Chinese Application 202010786641.X dated Oct. 26, 2022 16 Pages (With Translation).
The European Patent Office (EPO) Extended Search Report for EP Application No. 21789597.8, dated Nov. 16, 2022 11 Pages.
The European Patent Office (EPO) Extended Search Report for EP Application No. 21789597.8 dated Aug. 12, 2022 13 Pages.
The India Intellectual Proprty Office (INPO) Examination Report for IN Application No. 202217009095 dated Dec. 16, 2022 6 Pages.
The World Intellectual Property Organization (WIPO) International Search Report and Written Opinion for PCT/CN2021/089665 dated Jul. 30, 2021 17 pages (including English translation).
The China National Intellectual Property Administration (CNIPA) The First Office Action for Chinese Application 202010786523.9 dated Oct. 24, 2022 17 Pages (With Translation).
The China National Intellectual Property Administration (CNIPA) The Second Office Action for Chinese Application 202010786523.9 dated Feb. 28, 2023 10 Pages (With Translation).
The European Patent Office (EPO) Extended Search Report for EP Application No. 21790065.3 dated Nov. 18, 2022 11 Pages.
The European Patent Office (EPO) Extended Search Report for EP Application No. 21790065.3 dated Aug. 18, 2022 13 Pages.
The World Intellectual Property Organization (WIPO) International Search Report and Written Opinion for PCT/CN2021/089319 dated Jul. 26, 2021 14 pages (including English translation).
The World Intellectual Property Organization (WIPO) International Search Report and Written Opinion for PCT/CN2021/109686 dated Apr. 25, 2022 12 pages (including English translation).
The United States Patent and Trademark Office (USPTO) The office action for 18149672 dated May 30, 2023 7 Pages.
The World Intellectual Property Organization (WIPO) International Search Report and Written Opinion for PCT/CN2020/119736 dated Apr. 28, 2021 17 pages (including English translation).
The United States Patent and Trademark Office (USPTO) The office action for 18053493 dated Mar. 9, 2023 33 Pages.
The United States Patent and Trademark Office (USPTO) U.S. Appl. No. 17/970,603, filed Oct. 21, 2022 51 Pages.
The World Intellectual Property Organization (WIPO) International Search Report and Written Opinion for PCT/CN2020/119738 dated Jun. 25, 2021 17 pages (including English translation).

(56) References Cited

OTHER PUBLICATIONS

The China National Intellectual Property Administration (CNIPA) The First Office Action for Chinese Application 202080054659.9 dated Jun. 24, 2023 14 Pages (With Translation).
The China National Intellectual Property Administration (CNIPA) The First Office Action for CN Application No. 202080054687.0 dated Jul. 24, 2023 14 Pages (Including English translation).
The United States Patent and Trademark Office (USPTO) Office Action for U.S. Appl. No. 17/970,603, filed Jul. 19, 2023 19 Pages.
Japan Patent Office (JPO) The Notice of Reasons for Refusal for JP Application No. 2022-542009 dated Sep. 4, 2023 6 Pages (Translation Included).
The European Patent Office (EPO) The Extended Search Report for EP Application No. 20961838.8 dated Aug. 17, 2023 10 Pages.
Japan Patent Office (JPO) The Notice of Reasons for Refusal for JP Application No. 2022-539699 dated Jul. 31, 2023 8 Pages (Translation Included).
The United States Patent and Trademark Office (USPTO) Office Action for U.S. Appl. No. 17/985,813, filed Aug. 9, 2023 49 Pages.
The European Patent Office (EPO) The Extended Search Report for EP Application No. 20955828.7 dated Sep. 27, 2023 6 Pages.
Japan Patent Office (JPO) The Notice of Reasons for Refusal For JP Application No. 2022-542013 dated Oct. 2, 2023 9 Pages (Translation Included).
The European Patent Office (EPO) The Extended Search Report for EP Application No. 21937198.6 dated Aug. 14, 2023 7 Pages.
United States Patent and Trademark Office (USPTO) Notice of Allowance for U.S. Appl. No. 17/985,813, filed Dec. 12, 2023 17 Pages.
United States Patent and Trademark Office (USPTO) Non Final Office Action for U.S. Appl. No. 18/053,493, filed Jan. 29, 2024 39 Pages.
The Japan Patent Office (JPO) Notification of Reasons for Refusal for Application No. 2022-539699 Jan. 29, 2024 9 Pages (including translation).
The Japan Patent Office (JPO) Notification of Reasons for Refusal for Application No. 2022-542009 Feb. 5, 2024 8 Pages (including translation).
United States Patent and Trademark Office (USPTO) Notice of Allowance for U.S. Appl. No. 17/985,813, filed Feb. 22, 2024 12 Pages.
The European Patent Office (EPO) The Extended European Search Report for Application No. 20955829.5 Mar. 25, 2024 8 Pages.
The Japan Patent Office (JPO) Decision to Grant a Patent for Application No. 2022-542013 and Translation Mar. 18, 2024 6 Pages.
The United States Patent and Trademark Office (USPTO) The office action for U.S. Appl. No. 17/970,603, filed Apr. 18, 2024 28 Pages.
Korean Intellectual Property Office (KIPO) Notice of Allowance for Application No. 10-2022-7021878 May 10, 2024 5 pages (inlcuding translation).

\* cited by examiner

0
BATTERY, APPARATUS, AND PREPARATION METHOD AND PREPARATION APPARATUS OF BATTERY

CROSS-REFERENCE TO RELATED APPLICATIONS

This application is a continuation application of International Patent Application No. PCT/CN2020/119738, filed with China National Intellectual Property Administration on Sep. 30, 2020, which is incorporated herein by reference in its entirety.

TECHNICAL FIELD

This application relates to the field of energy storage technologies, and in particular, to a battery, an apparatus, and a preparation method and a preparation apparatus of battery.

BACKGROUND

Energy conservation and emission reduction are key to sustainable development of automobile industry. In this case, due to the advantage of energy conservation and emission reduction, electric vehicles have become an important part for sustainable development in automobile industry. For electric vehicles, battery technology is an important factor related to their development. In the development of the battery technology, in addition to performance improvement, safety is another important issue of batteries. If safety of a battery cannot be guaranteed, a battery is unusable. Therefore, how safety of the battery is enhanced requires an urgent solution in the battery technology.

SUMMARY

In view of the foregoing problem, embodiments of this application provide a battery, an apparatus, a preparation method of battery, and a preparation apparatus of battery, so as to improve use safety of the battery.

In order to achieve the foregoing objective, the embodiments of this application provide the following technical solutions.

A first aspect of the embodiments of this application provides a battery, including:
- at least two battery cells, where the at least two battery cells each include a pressure relief mechanism, and the pressure relief mechanism is configured to be actuated when internal pressure or temperature in the battery cell reaches a threshold, to release the internal pressure; and
- at least two discharge channels, where the discharge channels are spaced apart from each other and disposed facing the pressure relief mechanisms, and the at least two discharge channels are configured to collect emissions respectively from the corresponding battery cell when the pressure relief mechanism is actuated.

Compared with the prior art, the battery provided in the embodiments of this application has the following advantages.

In the battery provided in this embodiment of this application, the pressure relief mechanism is provided on all of the at least two battery cells, so that when the internal pressure or temperature of the battery cell reaches the threshold, the internal pressure is released, and the pressure relief mechanisms on the at least two battery cells are disposed respectively facing the discharge channels spaced apart from each other, so that when the internal pressure or temperature of each of the battery cells reaches the threshold, the emissions in the at least two battery cells can be discharged through different discharge channels, the emissions in the battery cells can be efficiently discharged in a timely manner, so as to effectively reduce the probability that the discharge channel is blocked by solid substances discharged from the battery cell, thereby improving use safety of the battery.

In some embodiments, the at least two battery cells include a first battery cell and a second battery cell that are arranged adjacently. A pressure relief mechanism of the first battery cell and a pressure relief mechanism of the second battery cell are disposed respectively facing different discharge channels. Therefore, the first battery cell and the second battery cell that are adjacent can discharge emissions through the different discharge channels respectively, so that the emissions from the first battery cell and the second battery cell can be effectively discharged out of respective housings in a timely manner, thereby improving use safety of the battery.

In some embodiments, energy density of the first battery cell is greater than energy density of the second battery cell, and this can ensure use safety of the battery, and can also improve capacity of the battery. In addition, thermal failure reaction of the first battery cell is more violent, and the first battery cell and the second battery cell are arranged adjacently, helping reduce chain reaction of thermal failure and slow down spread of thermal diffusion, and further improving use safety of the battery.

In some embodiments, the first battery cell and the second battery cell are alternately arranged in an arrangement mode of n first battery cells and m second battery cells, where n≥1, and m≥1. Therefore, the first battery cell and the second battery cell that have different energy densities are alternately arranged, helping slow down spread of thermal diffusion, and improving use safety of the battery.

In some embodiments, the first battery cell is provided in a quantity of at least two, and the pressure relief mechanisms of two adjacent first battery cells are disposed facing the different discharge channels respectively. Therefore, the different first battery cells can discharge emissions through the different discharge channels respectively, so that emissions from the first battery cells can be effectively discharged out of the battery in a timely manner. In addition, a probability that thermal failure of the first battery cell causes thermal failure of the second battery cell can be effectively reduced, thereby helping relieve chain reaction of thermal failure and improving use safety of the battery.

In some embodiments, the second battery cell is provided in a quantity of at least two, and the pressure relief mechanisms of two adjacent second battery cells are disposed facing the different discharge channels respectively. Therefore, the different second battery cells can discharge emissions through the different discharge channels respectively, so that emissions from the second battery cells can be effectively discharged out of the battery in a timely manner. In addition, a probability that thermal failure of the second battery cell causes thermal failure of the first battery cell can be effectively reduced, thereby helping relieve chain reaction of thermal failure and improving use safety of the battery.

In some embodiments, a first thermal insulation member is disposed between two adjacent first battery cells. Therefore, when thermal failure occurs in one of the first battery cells, the first thermal insulation member can effectively prevent the first battery cell adjacent to the first battery cell in thermal failure from thermal failure, thereby improving use safety of the battery.

In some embodiments, a second thermal insulation member is disposed between adjacent second battery cells. Therefore, when thermal failure occurs in one of the second battery cells, the second thermal insulation member can effectively prevent the second battery cell adjacent to the second battery cell in thermal failure from thermal failure, thereby improving use safety of the battery.

In some embodiments, a third thermal insulation member is disposed between the first battery cell and the second battery cell that are adjacent. Therefore, when thermal failure occurs in one of the first battery cells, the third thermal insulation member can effectively prevent the second battery cell adjacent to the first battery cell in thermal failure from thermal failure, and vice versa.

In some embodiments, an area of the pressure relief mechanism of the first battery cell is greater than an area of the pressure relief mechanism of the second battery cell. Therefore, even if thermal failure reaction of the first battery cell is more violent, the first battery cell can discharge emissions out of the battery in a timely manner through the pressure relief mechanism of the first battery cell with a larger area. In this case, the second battery cell can also discharge emissions out of the battery in a timely manner through the pressure relief mechanism of the second battery cell, improving use safety of the battery.

In some embodiments, the battery further includes a box body, where the box body has a plurality of walls, the plurality of walls are configured to enclose an accommodating cavity for accommodating the battery cells, a hollow cavity is provided in at least one of the plurality of walls, and the hollow cavity is configured to form the discharge channel. The box body is configured to protect the battery cells that are placed in the accommodating cavity. The hollow cavity for forming the discharge channel is provided in at least one of the plurality of walls of the box body. This allows the pressure relief mechanisms of the battery cells to be disposed facing the hollow cavity, so that when internal pressure or temperature of the battery cell reaches a threshold, emissions from the battery cell can be discharged into the hollow cavity. Therefore, emissions from the battery cell during thermal failure can be effectively discharged out of the battery in a timely manner, thereby improving use safety of the battery.

In some embodiments, the plurality of walls include a bottom wall, where the bottom wall is configured to support the battery cells, and the bottom wall has the hollow cavity. Therefore, emissions from the battery cell are discharged downwards and enter the hollow cavity at the bottom through the pressure relief mechanism. With this arrangement mode of the battery, after the battery is placed in a battery compartment of a vehicle, the battery can discharge emissions to the bottom of the vehicle rather than discharging emissions to a passenger compartment that is located above the battery compartment, thereby further improving use safety of the battery.

In some embodiments, at least one wall is configured to be broken when the pressure relief mechanism is actuated, to cause the emissions from the battery cell to pass through the at least one wall and enter the discharge channel. Therefore, when internal pressure or temperature of the battery cell reaches a threshold, the pressure relief mechanism of the battery cell is actuated, and when the emissions in the battery cell are discharged, the emissions discharged by the battery cell may act on the at least one wall of the box body, so that a part of the box body facing the pressure relief mechanism of the battery cell is broken. The hollow cavity of the box body communicates with the pressure relief mechanism, so that the emissions in the battery cell can be effectively discharged into the discharge channel in a timely manner, thereby further improving use safety of the battery.

In some embodiments, a first through-hole is provided in at least one wall, the first through-hole is configured to communicate with the discharge channel, so that when the pressure relief mechanism is actuated, the emissions from the battery cell enter the discharge channel via the first through-hole. Therefore, when internal pressure or temperature of the battery cell reaches a threshold, the pressure relief mechanism of the battery cell is actuated, and when the emissions in the battery cell are discharged, the discharged emissions of the battery cell enter the hollow cavity of the box body via the first through-hole, so that the emissions in the battery cell can be effectively discharged into the discharge channel in a timely manner, thereby further improving use safety of the battery.

In some embodiments, the battery further includes a thermal management component, configured to accommodate fluid to adjust temperature of the battery cells. The thermal management component is disposed between the battery cell and the at least one wall. The thermal management component is configured to be broken when the pressure relief mechanism is actuated, to cause the fluid to flow out. Therefore, the emissions from the battery cell can enter the discharge channel via the broken thermal management component. In addition, with the thermal management component broken, the fluid can flow out, so that internal temperature of the battery is rapidly reduced through the fluid, helping relieve chain reaction of thermal failure, and improving use safety of the battery.

In some embodiments, a second through-hole is provided in the thermal management component, and the second through-hole is configured to communicate with the discharge channel, so that when the pressure relief mechanism is actuated, the emissions from the battery cell enter the discharge channel via the second through-hole. Therefore, the emissions discharged by the battery cell can rapidly and smoothly enter the exhaust channel via the second through-hole, thereby improving use safety of the battery.

In some embodiments, the second through-hole communicates with the discharge channel via the first through-hole. Therefore, the emissions discharged by the battery cell can rapidly and smoothly enter the first through-hole via the second through-hole, and then enter the exhaust channel, thereby improving use safety of the battery.

A second aspect of the embodiments of this application provides an apparatus, including the foregoing battery, where the battery is configured to supply electric energy.

The apparatus of this application is supplied with electric energy by using the foregoing battery. Therefore, when internal pressures or temperatures of the battery cells reach the threshold, emissions from at least two battery cells can be discharged through different discharge channels, the emissions in the battery cells can be efficiently discharged in a timely manner, so as to effectively reduce the probability that the discharge channel is blocked by solid substances discharged from the battery cell, thereby improving use safety of the battery.

A third aspect of the embodiments of this application provides a preparation method of battery, including the following steps:

configuring at least two battery cells, where the at least two battery cells each include a pressure relief mechanism, and the pressure relief mechanism is configured to be actuated when internal pressure or temperature in the battery cell reaches a threshold, to release the internal pressure; and configuring at least two discharge channels, where the discharge channels are spaced apart from each other and disposed facing the pressure relief mechanisms, and the at least two discharge channels are configured to collect emissions respectively from the corresponding battery cell when the pressure relief mechanism is actuated.

In the preparation method of battery provided in this application, at least two battery cells and at least two discharge channels are configured, and the at least two discharge channels are configured to collect emissions respectively from the corresponding battery cell when the pressure relief mechanism of the battery cell is actuated. In this way, when internal pressures or temperatures of the battery cells reach the threshold, the emissions in the at least two battery cells can be discharged through different discharge channels, the emissions in the battery cells can be efficiently discharged in a timely manner, so as to effectively reduce the probability that the discharge channel is blocked by solid substances discharged from the battery cell, thereby improving use safety of the battery.

A fourth aspect of the embodiments of this application provides a preparation apparatus of battery, including:

a battery cell configuration module, configured to configure at least two battery cells, where the at least two battery cells each include a pressure relief mechanism, and the pressure relief mechanism is configured to be actuated when internal pressure or temperature in the battery cell reaches a threshold, to release the internal pressure; and a discharge channel configuration module, configured to configure at least two discharge channels, where the discharge channels are spaced apart from each other and disposed facing the pressure relief mechanisms, and the at least two discharge channels are configured to collect emissions respectively from the corresponding battery cell when the pressure relief mechanism is actuated.

In the preparation apparatus of battery provided in this embodiment, a battery cell configuration module is configured to configure at least two battery cells, a discharge channel configuration module is configured to configure at least two discharge channels, and the at least two discharge channels are configured to collect emissions respectively from the corresponding battery cell when the pressure relief mechanism of the battery cell is actuated. In this way, when internal pressures or temperatures of the battery cells reach the threshold, the emissions in the at least two battery cells can be discharged through different discharge channels, the emissions in the battery cells can be efficiently discharged in a timely manner, so as to effectively reduce the probability that the discharge channel is blocked by solid substances discharged from the battery cell, thereby improving use safety of the battery.

Figure 1:
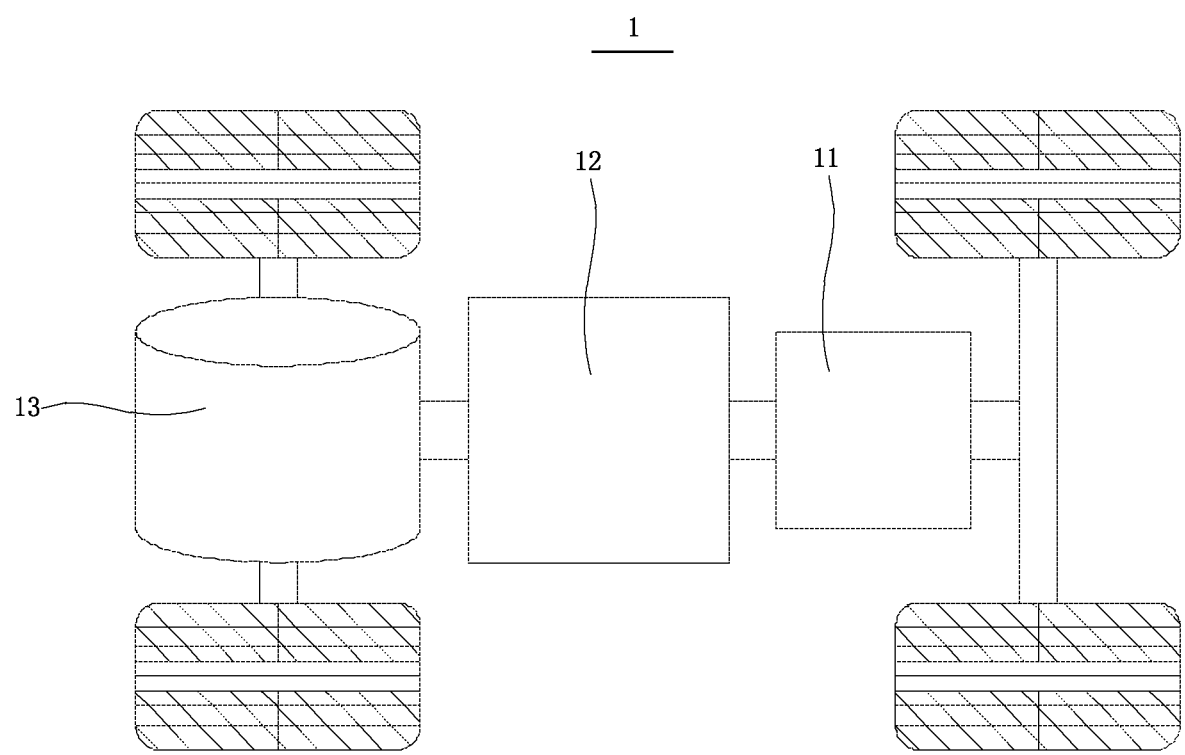
FIG. 1 is a schematic structural diagram of a vehicle according to this application.

REFERENCE SIGNS 1. vehicle;
   11. battery;
      111. battery cell;
         1111. pressure relief mechanism;
         1112. positive electrode terminal;
         1113. negative electrode terminal;
         1114. housing;
         1115. first battery cell;
         1116. second battery cell;
      112. discharge channel;
      113. box body;
         1131. bottom wall;
         1132. side wall;
         1133. first through-hole;
      114. first thermal insulation member;
      115. second thermal insulation member;
      116. third thermal insulation member;
      117. thermal management component;
         1171. second through-hole;
   12. controller; and
   13. motor.

DESCRIPTION OF EMBODIMENTS

A battery is an apparatus for converting chemical energy into electric energy, and is widely applied to fields of new energy vehicles, energy storage power stations, and the like.

An existing type of battery includes a box body and a plurality of battery cells disposed in the box body, where the plurality of battery cells are connected in series and/or parallel. A discharge channel is provided in the box body, pressure relief mechanisms are provided on a plurality of battery cells, and the pressure relief mechanisms on the plurality of battery cells communicate with the discharge channel. When thermal failure occurs in a battery cell, the battery cell can discharge high-temperature and high-pressure gas in the battery cell through the pressure relief mechanism to the discharge channel, and then out of the battery through the discharge channel, thereby improving use safety.

However, the inventors of this application have found through research that under the condition that there are a large number of battery cells in the battery, thermal failure in a battery cell often triggers chain reaction. To be specific, thermal failure in a single battery cell causes a local temperature to rise sharply, thereby causing thermal failure to occur in a plurality of battery cells. The plurality of battery cells all discharge high-temperature and high-pressure gas to a same discharge channel, so that a temperature in the discharge channel is further risen, further aggravating the thermal failure. This chain reaction of thermal failure increases risks of combustion and explosion, and reduce use safety of the battery. In addition, when thermal failure occurs in a battery cell, not only high-temperature and high-pressure gas may be discharged through the pressure relief mechanism, but also some solid substances such as electrode plates may be released. Such solid substances enter the discharge channel along with the gas flow and block the discharge channel, causing the heat in the discharge channel to further accumulate, thereby further aggravating the chain reaction and reducing use safety of the battery.

To resolve the problem that a plurality of battery cells all discharge high-temperature and high-pressure gas to a same discharge channel, and solid substances discharged from the battery cell are likely to block the discharge channel, leading to a high incidence of combustion and explosion of the battery, and low use safety of the battery, this application provides a battery, an apparatus, a preparation apparatus of battery, and a preparation method of battery. By configuring at least two discharge channels in the battery, when internal pressures or temperatures of at least two battery cells reach the threshold, the emissions in the at least two battery cells can be discharged through the at least two discharge channels spaced apart from each other, then the emissions in the battery cells can be efficiently discharged out of the battery cells in a timely manner, thereby reducing an incidence of combustion and explosion of the battery cell, and improving use safety of the battery.

The following clearly and completely describes the technical solutions in the embodiments of this application with reference to the accompanying drawings in the embodiments of this application, so that the foregoing objectives, features and advantages of the embodiments of this application can be clearer. Apparently, the described embodiments are merely some but not all of the embodiments of this application. All other embodiments obtained by a person of ordinary skill in the art based on the embodiments of this application without creative efforts shall fall within the protection scope of this application.

Embodiments of this application provide an apparatus and a battery. The apparatus provided in this application includes the battery, where the battery is configured to supply electric energy. The apparatus provided in this application is, for example, a mobile phone, a portable device, a laptop, an electric scooter, an electric vehicle, a steamship, a spacecraft, an electric toy, or an electric tool. The spacecraft is, for example, an airplane, a rocket, a space shuttle, or a spaceship. The electric toy includes, for example, a fixed or mobile electric toy, such as a game console, an electric vehicle toy, an electric ship toy, and an electric airplane toy. The electric tool includes, for example, an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer.

The battery described in this application is not limited to be applied to the electric apparatuses described above. However, for ease of description, the following embodiments are all described by using an electric vehicle as an example.

FIG. 1 is a simple schematic diagram of a vehicle 1 according to an embodiment. The vehicle 1 may be an oil-fueled vehicle, a gas-powered vehicle, or a new energy vehicle. The new energy vehicle may be a battery electric vehicle, a hybrid electric vehicle, an extended-range electric vehicle, or the like. A battery 11 may be disposed in the vehicle 1. In a specific example, the battery 11 may be disposed at a bottom, vehicle head, or vehicle tail of the vehicle 1. The battery 11 may be configured to supply power to the vehicle 1. For example, the battery 11 may be used as an operational power supply for the vehicle 1. The vehicle 1 may further include a controller 12 and a motor 13. The controller 12 is, for example, configured to control the battery 11 to supply power to the motor 13. The battery 11 may be configured to start and navigate the vehicle 1. Certainly, the battery 11 may also be configured to drive the vehicle 1, and replace or partly replace fuel oil or natural gas to supply driving power to the vehicle 1.

Figure 2:
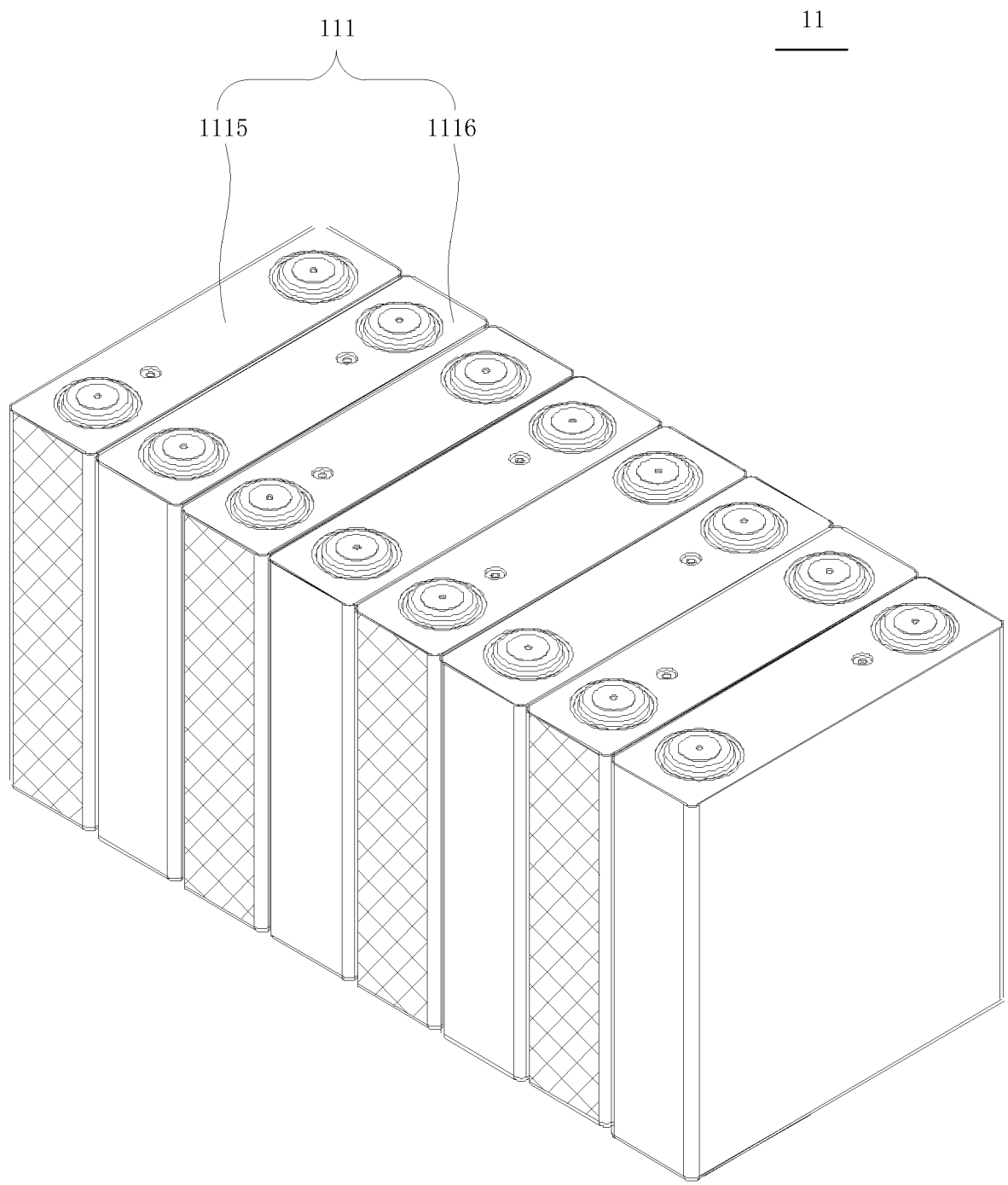
FIG. 2 is a schematic structural diagram of a battery module according to an embodiment of this application.
Figure 3:
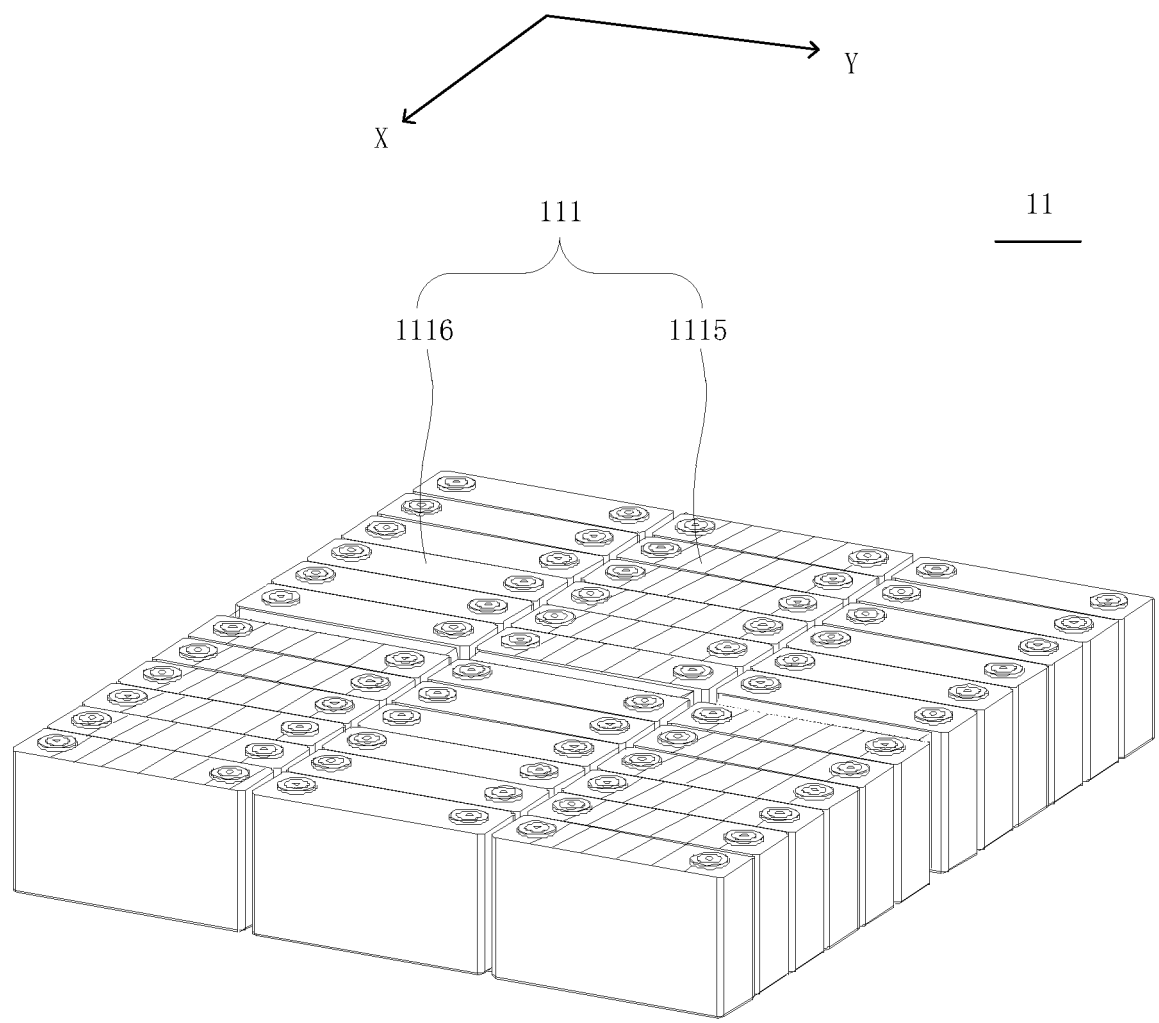
FIG. 3 is a schematic structural diagram of a battery pack according to an embodiment of this application.

The battery 11 mentioned in this embodiment may be a battery module shown in FIG. 2, a battery pack shown in FIG. 3, or the like. Basic structural units of the battery module and the battery pack are battery cells 111. A plurality of battery cells 111 are connected in series and/or parallel by using electrode terminals, for use in various electric apparatuses. The battery module protects the battery cells 111 against external impact, heat, vibration, and the like. A specific quantity of battery cells 111 are electrically connected together and placed into a frame to form the battery module. The battery pack is a final state of a battery system assembled in an electric vehicle. Most existing battery packs are formed by assembling various control and protection systems such as a battery management system and a thermal management component on one or more battery modules. With the development of technologies, the battery module may be omitted, that is, the battery pack is directly formed using battery cells 111. With this improvement, weight energy density and volumetric energy density of the battery system are improved, and the number of parts is remarkably reduced.

Figure 4:
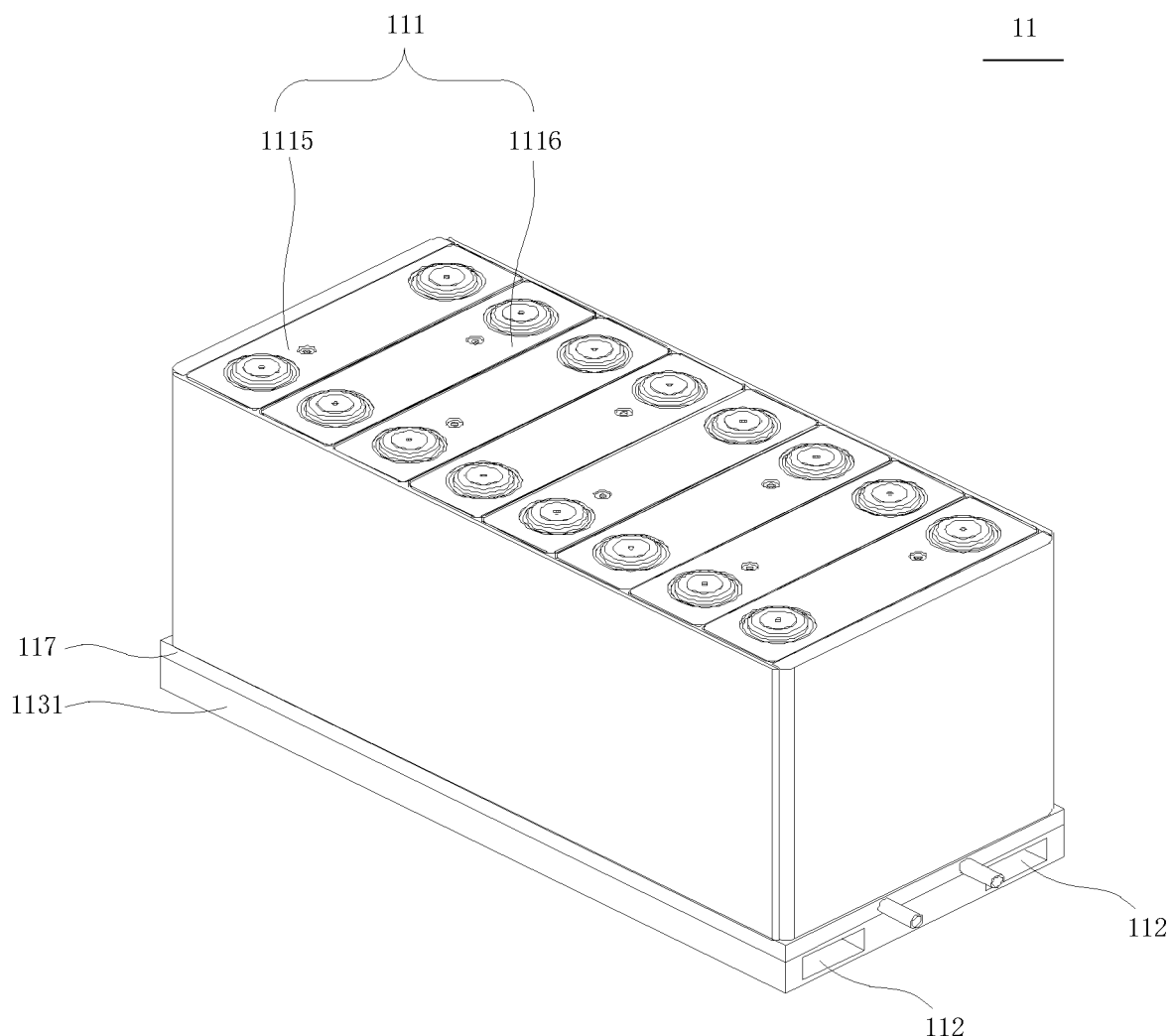
FIG. 4 is a first schematic structural diagram of a battery according to an embodiment of this application.
Figure 5:
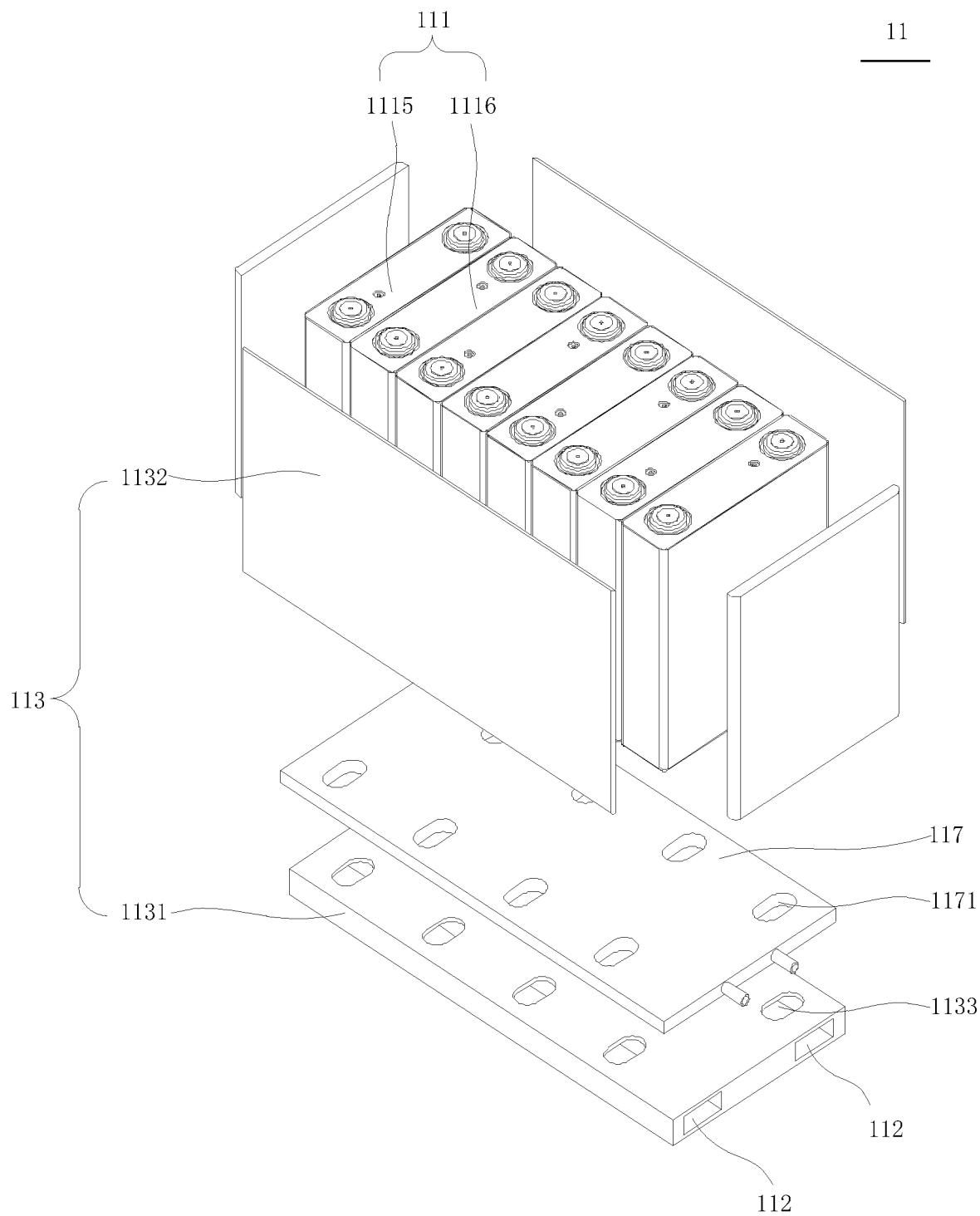
FIG. 5 is a first exploded view of a battery according to an embodiment of this application.
Figure 6:
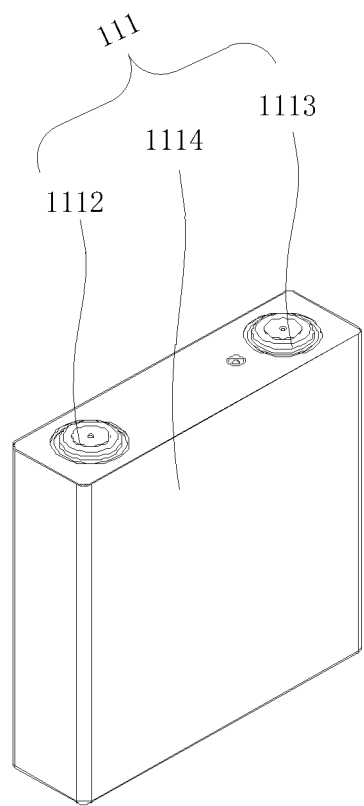
FIG. 6 is a schematic structural diagram of a battery cell according to an embodiment of this application.
Figure 7:
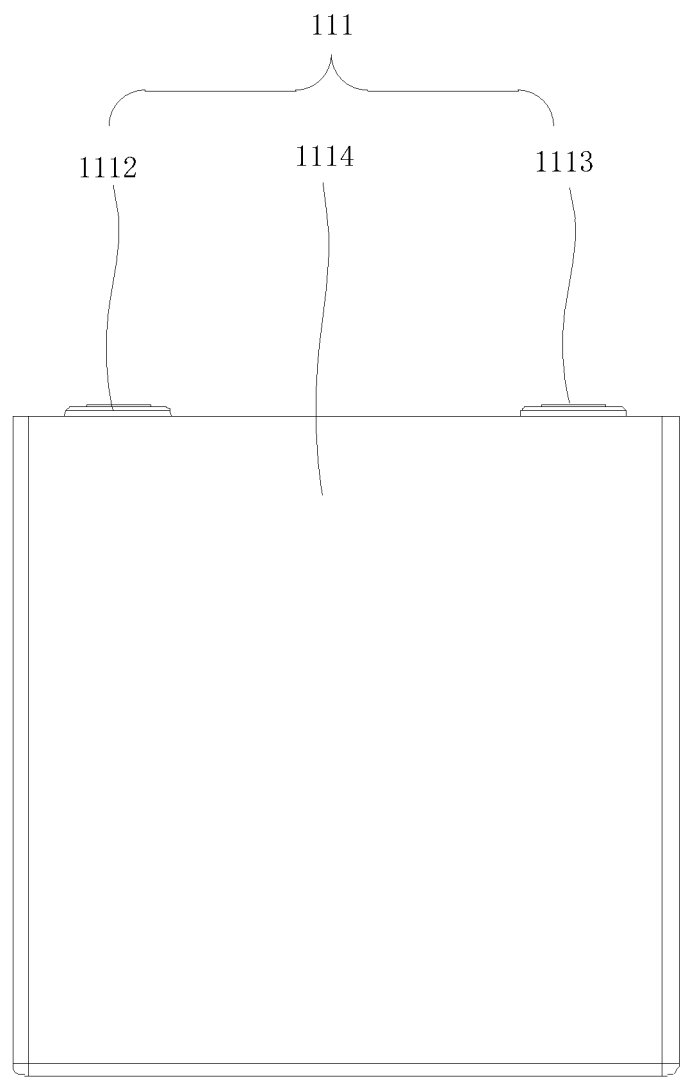
FIG. 7 is a main view of a battery cell according to an embodiment of this application.
Figure 8:
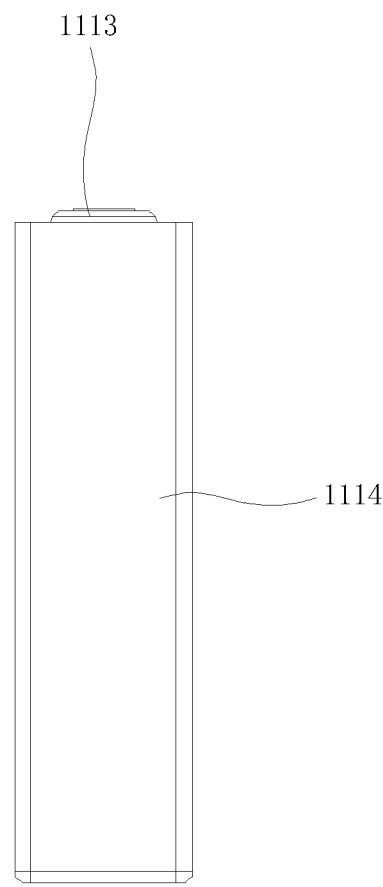
FIG. 8 is a right view of a battery cell according to an embodiment of this application.
Figure 9:
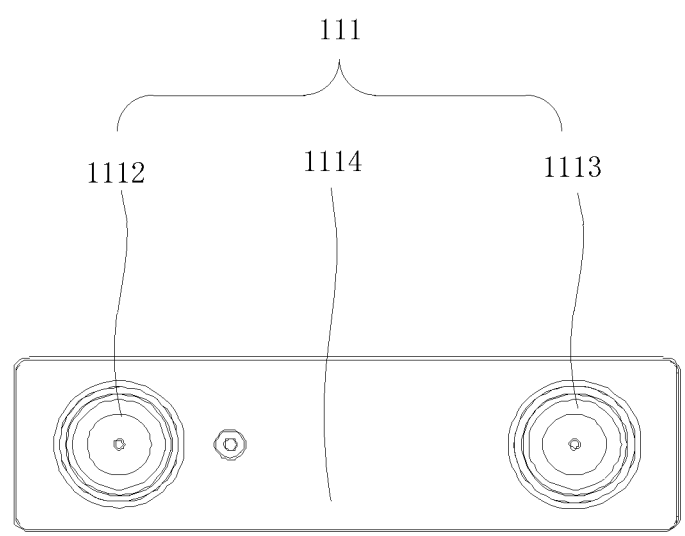
FIG. 9 is a vertical view of a battery cell according to an embodiment of this application.

As shown in FIG. 4 and FIG. 5, the battery 11 of this application includes: at least two battery cells 111 and at least two discharge channels 112. The at least two battery cells 111 each include a pressure relief mechanism 1111 (referring to FIG. 11 and FIG. 12), and the pressure relief mechanism 1111 is configured to be actuated when internal pressure or temperature in the battery cell 111 reaches a threshold, to release the internal pressure. The discharge channels 112 are spaced apart from each other and disposed facing the pressure relief mechanisms 1111, and the at least two discharge channels 112 are configured to collect emissions respectively from the corresponding battery cell 111 when the pressure relief mechanism 1111 is actuated.

The pressure relief mechanism 1111 refers to an element or a component that can be actuated to release an internal pressure and/or internal substances when the internal pressure or an internal temperature of the battery cell 111 reaches a predetermined threshold. The pressure relief mechanism 1111 may specifically use a form of an explosion-proof valve, a gas valve, a pressure relief valve, a safety valve, or the like, and may specifically employ a pressure-sensitive or temperature-sensitive element or structure, that is, when the internal pressure or temperature of the battery cell 111 reaches a predetermined threshold, the pressure relief mechanism 1111 performs action or a thin and weak structure provided in the pressure relief mechanism 1111 is broken, so that an opening or channel for releasing the internal pressure is formed. The threshold referred to in this application may be a pressure threshold or a temperature threshold. Design of the threshold varies according to different design requirements. For example, the threshold may be designed or determined based on an internal pressure or internal temperature of a battery cell 111 that is considered to be dangerous or at a risk of losing control. In addition, the threshold may depend on, for example, a material used in one or more of the positive electrode plate, the negative electrode plate, the electrolyte and the separator in the battery cell 111.

The "actuated" mentioned in this application means that the pressure relief mechanism 1111 produces action or is activated to a specified state, so that the internal pressure of the battery cell 111 can be released. The action produced by the pressure relief mechanism 1111 may include, but is not limited to: at least part of the pressure relief mechanism 1111 is cracked, broken, torn or opened, or the like. When the pressure relief mechanism 1111 is actuated, the high-temperature and high-pressure substances in the battery cell 111 are discharged as emissions from an actuated site. In this way, the pressure of the battery cell 111 can be released when the pressure or temperature is controllable, thereby avoiding potentially more serious accidents. The emissions from the battery cell 111 that are mentioned in this application include, but are not limited to: an electrolyte, fragments of the positive electrode plate, negative electrode plate and separator that are dissolved or split, high-temperature and high-pressure gas and flame generated by the reaction, and the like. The high-temperature and high-pressure emissions are discharged towards a direction in which the pressure relief mechanism 1111 is disposed on the battery cell 111, and more specifically, may be discharged towards a direction of a zone at which the pressure relief mechanism 1111 actuates. Power and destructive impact of the emissions may be quite large, and even may be large enough to break through one or more parts in this direction.

In this application, the battery cell 111 may include a lithium-ion secondary battery, a lithium-ion primary battery, a lithium-sulfur battery, a sodium-lithium-ion battery, a sodium-ion battery, a magnesium-ion battery, or the like, and this is not limited in the embodiments of this application. The battery cell 111 may be cylindrical, flat, rectangular, or another shape, and this is also not limited in the embodiments of this application. The battery cells 111 are usually categorized into three types depending on their packaging: cylinder cell, prismatic cell and pouch battery cell, and this is also not limited in the embodiments of this application.

As shown in FIG. 6 to FIG. 9, the battery cell 111 generally includes an electrode assembly (not shown) and an electrolyte (not shown), where the electrode assembly includes a positive electrode plate, a negative electrode plate, and a separator disposed between the positive electrode plate and the negative electrode plate, and the battery cell operates mainly depending on movements of metal ions between the positive electrode plate and the negative electrode plate. The positive electrode plate includes a positive electrode current collector and a positive electrode active substance layer. The positive electrode active substance layer is applied on a surface of the positive electrode current collector. A current collector uncoated with the positive electrode active substance layer bulges out of a current collector coated with the positive electrode active substance layer, and the current collector uncoated with the positive electrode active substance layer is used as a positive tab. Using the lithium-ion battery as an example, a material of the positive electrode current collector may be aluminum, and the positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. A current collector uncoated with the negative electrode active substance layer bulges out of a current collector coated with the negative electrode active substance layer, and the current collector uncoated with the negative electrode active substance layer is used as a negative tab. A material of the negative electrode current collector may be copper, and the negative electrode active substance can be carbon, silicon, or the like. To ensure that a large current can pass through them without fusing, there are a plurality of positive electrode tabs stacked together, and there are a plurality of negative electrode tabs stacked together. A material of the separator may be polypropylene (PP for short), polyethylene (PE for short), or the like. In addition, the electrode assembly may be of a winding structure or a laminated structure. There may be one or more electrode assemblies. This is not specifically limited in the embodiments of this application. The battery cell 111 further includes a housing 1114, where the electrode assembly and the electrolyte are both packaged in the housing 1114, the housing 1114 may be a hollow cuboid, cube, or cylinder, a material of the housing 1114 may be aluminum or steel and its alloy, or may be plastic material or aluminum-plastic film. A positive electrode terminal 1112 and a negative electrode terminal 1113 are further disposed on the housing 1114, the positive tab is electrically connected to the positive electrode terminal 1112, and the negative tab is electrically connected to the negative electrode terminal 1113, so as to output electric energy. The pressure relief mechanism 1111 may be also disposed on the housing 1114. The pressure relief mechanism 1111 may be disposed in any position of the housing 1114. For example, the pressure relief mechanism 1111 may be disposed on the top, the bottom, or a side of the housing 1114, or the pressure relief mechanism 1111 may be disposed between the positive electrode terminal 1112 and the negative electrode terminal 1113. This is not specifically limited in this application, as long as the internal pressure of the battery cell 111 can be released.

In some embodiments, as shown in FIG. 5, the battery 11 further includes a box body 113. The box body 113 has a plurality of walls, the plurality of walls are configured to enclose an accommodating cavity for accommodating the battery cells 111, a hollow cavity is provided in at least one of the plurality of walls, and the hollow cavity is configured to form the discharge channel 112. The box body 113 may be sealed or unsealed. In a specific example, the box body 113 includes a top wall (not shown) located on the top, a bottom wall 1131 located on the lower side, and a side wall 1132 located on a periphery of the bottom wall 1131, where the top wall and the bottom wall 1131 cover openings of two ends of the side wall 1132 respectively, so as to enclose the accommodating cavity together with the side wall 1132. Certainly, the side wall 1132 may be formed by connecting four secondary side walls end to end, or may be an integrated part. The box body 113 is configured to protect the battery cells 111 that are placed in the accommodating cavity. The hollow cavity for forming the discharge channel 112 is provided in at least one of the plurality of walls of the box body 113. This allows the pressure relief mechanisms 1111 of the battery cells 111 to be disposed facing the hollow cavity, so that when internal pressure or temperature of the battery cell 111 reaches a threshold, emissions from the battery cell 111 can be discharged into the hollow cavity.

Further, the bottom wall 1131 is configured to support the battery cell 111, and the hollow cavity is provided in the bottom wall 1131. Correspondingly, the pressure relief mechanism 1111 of the battery cell 111 are disposed at the bottom of its housing 1114. Therefore, emissions in the battery cell 111 are discharged downwards and enter the hollow cavity at the bottom through the pressure relief mechanism 1111. With this arrangement mode of the battery 11, after the battery 11 is placed in a battery compartment of a vehicle 1, the battery 11 can discharge emissions to the bottom of the vehicle 1 rather than discharging emissions to a passenger compartment that is located above the battery compartment, thereby further improving use safety of the battery 11.

In some embodiments, to facilitate the emissions from the battery cell 111 to be effectively discharged into the discharge channel 112 in a timely manner, the pressure relief mechanism 1111 of the battery cell 111 is configured to be capable of communicating with the discharge channel 112. A communication mode of the pressure relief mechanism 1111 of the battery cell 111 and the hollow cavity for forming the discharge channel 112 on the box body 113 is described in the following two implementations. It should be noted that the following two implementations are merely examples of two feasible implementations, but not to limit the communication mode of the pressure relief mechanism 1111 of the battery cell 111 and the hollow cavity.

In an implementation, at least one wall of the box body 113 of the battery 11 is configured to be broken when the pressure relief mechanism 1111 is actuated, to allow the emissions from the battery cell 111 to pass through the at least one wall and enter the discharge channel 112. In other words, the hollow cavity is provided in the at least one wall of the box body 113 that may be the top wall, the bottom wall 1131, or the side wall 1132. A part of the box body 113 facing the pressure relief mechanism 1111 of the battery cell 111 has a complete wall surface when the pressure relief mechanism 1111 is not actuated, that is, a part of the box body 113 facing the pressure relief mechanism 1111 of the battery cell 111 does not have a pore structure communicating with the hollow cavity when the pressure relief mechanism 1111 is not actuated. However, when internal pressure or temperature of the battery cell 111 reaches a threshold, the pressure relief mechanism 1111 of the battery cell 111 is actuated, and the emissions in the battery cell 111 are discharged, the emissions discharged by the battery cell 111 may act on the at least one wall of the box body 113, so that the part of the box body 113 facing the pressure relief mechanism 1111 of the battery cell 111 is broken (damaged or ruptured). The hollow cavity of the box body 113 communicates with the pressure relief mechanism 1111, so that the emissions in the battery cell 111 can be effectively discharged into the discharge channel 112 in a timely manner.

In another implementation, as shown in FIG. 5, a first through-hole 1133 is provided in at least one wall of the box body 113 of the battery 11 that may be the top wall, the bottom wall 1131, or the side wall 1132. The first through-hole 1133 is configured to communicate with the discharge channel 112, so that when the pressure relief mechanism 1111 is actuated, the emissions from the battery cell 111 enter the discharge channel 112 via the first through-hole 1133. When internal pressure or temperature of the battery cell 111 reaches a threshold, the pressure relief mechanism of the battery cell 111 is actuated, and the emissions in the battery cell 111 are discharged, the discharged emissions of the battery cell 111 can enter the hollow cavity of the box body 113 via the first through-hole 1133, so that the emissions in the battery cell 111 can be effectively discharged into the discharge channel 112 in a timely manner.

In the battery 11 provided in this embodiment of this application, the pressure relief mechanism 1111 is provided on all of the at least two battery cells 111, so that when the internal pressure or temperature of the battery cell 111 reaches the threshold, the internal pressure is released, and the pressure relief mechanisms 1111 on the at least two battery cells 111 are disposed respectively facing the discharge channels 112 spaced apart from each other, so that when the internal pressure or temperature of each of the battery cells 111 reaches the threshold, the emissions in the at least two battery cells 111 can be discharged through different discharge channels 112, the emissions in the battery cells 111 can be efficiently discharged in a timely manner, so as to effectively reduce the probability that the discharge channel 112 is blocked by solid substances discharged from the battery cell 111, thereby improving use safety of the battery 11.

Figure 10:
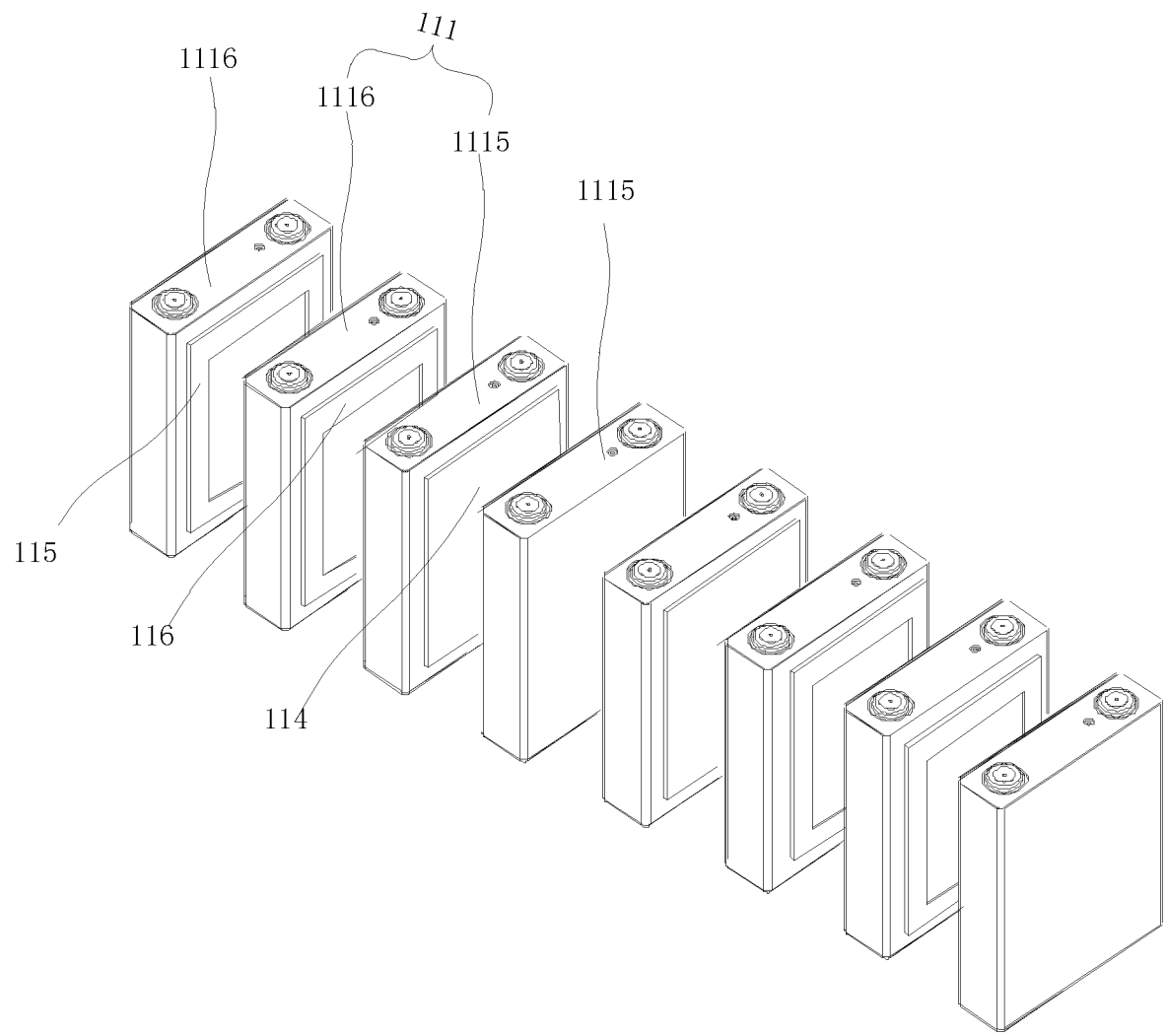
FIG. 10 is a second exploded view of a battery according to an embodiment of this application.

In some embodiments, as shown in FIG. 4, FIG. 5 and FIG. 10, the at least two battery cells 111 in the battery 11 include a first battery cell 1115 and a second battery cell 1116 that are arranged adjacently. A pressure relief mechanism 1111 of the first battery cell 1115 and a pressure relief mechanism 1111 of the second battery cell 1116 are disposed respectively facing different discharge channels 112. Therefore, the first battery cell 1115 and the second battery cell 1116 that are adjacent can discharge emissions through the different discharge channels 112 respectively, so that the emissions from the first battery cell 1115 and the second battery cell 1116 can be effectively discharged out of respective housings in a timely manner. This effectively reduces the probability that high-temperature and high-pressure gas released by the first battery cell 1115 causes its adjacent second battery cell 1116 to quickly undergo thermal failure. To be specific, chain reaction, that is, thermal diffusion, caused when the pressure relief mechanism is actuated is effectively reduced, which in turn effectively reduces the probability that the discharge channel 112 is blocked because both the adjacent first battery cell 1115 and second battery cell 1116 undergo thermal failure in a short period of time and the emissions all enter the same discharge channel 112, improving use safety of the battery 11.

The first battery cell 1115 and the second battery cell 1116 may be the same battery cell 111 or different battery cells 111. The term "same" as used herein means that the first battery cell 1115 and the second battery cell 1116 are substantially identical in chemical system, shape, size, volume, mass, energy density, or the like, while the term "different" as used herein means that there is a significant difference in at least one of chemical system, shape, size, volume, mass, energy density, or the like between the first battery cell 1115 and the second battery cell 1116. In some embodiments, energy density of the first battery cell 1115 is greater than energy density of the second battery cell 1116, where the energy density refers to energy released per unit mass or unit volume by the battery 11, namely weight energy density or volumetric energy density. In some embodiments, a range of a ratio of the energy density E1 of the first battery cell 1115 to the energy density E2 of the second battery cell 1116 satisfies: 1.26≤E1/E2≤2.14. In some embodiments, a first battery cell 1115 may be for example a ternary-lithium battery cell, specifically, for example, a lithium nickel cobalt manganate battery cell or lithium nickel cobalt battery cell, and a second battery cell 1116 may be for example a lithium iron phosphate battery cell or a lithium cobalt oxide battery cell. It should be noted that the energy density of the first battery cell 1115 is greater than the energy density of the second battery cell 1116, and when the first battery cell 1115 and the second battery cell 1116 are arranged adjacently, thermal failure reaction of the first battery cell 1115 is usually more violent. The first battery cell 1115 and the second battery cell 1116 are arranged adjacently, helping reduce chain reaction of thermal failure, that is helping slow down spread of thermal diffusion, and further improving use safety of the battery 11.

In some embodiments, no matter whether the first battery cell 1115 and the second battery cell 1116 are the same battery cell 111 or different battery cells 111, an arrangement of the first battery cell 1115 and the second battery cell 1116 can be as follows: the first battery cell 1115 and the second battery cell 1116 are alternately arranged in an arrangement of n first battery cells 1115 and m second battery cells 1116, where n≥1, m≥1, and n and m are integers.

Values of n and m may be the same, or may be different. For example, in some embodiments, as shown in FIG. 2, FIG. 4 and FIG. 5, values of n and m are both 1, that is, n=1 and m=1. In this case, the first battery cells 1115 and the second battery cells 1116 are arranged alternately to form a row or a column, that is, one second battery cell 1116 is disposed between two adjacent first battery cells 1115, and one first battery cell 1115 is disposed between two adjacent second battery cells 1116. For another example, in some embodiments, as shown in FIG. 3, values of n and m are both 6, that is, n=6 and m=6. In this case, six first battery cells 1115 and six second battery cells 1116 form an arrangement unit, three arrangement units are provided, the three arrangement units are arranged in a Y-axis direction shown in FIG. 3, the six first battery cells 1115 and the six second battery cells 1116 in each arrangement unit are arranged in an X direction shown in FIG. 3, and in two adjacent arrangement units, first battery cells 1115 and the second battery cells 1116 are arranged in a staggered manner. For another example, in some other implementations, as shown in FIG. 10, a value of n is 2, and a value of m is 2, that is, n=2 and m=2. In this case, the first battery cells 1115 and the second battery cells 1116 are arranged in a row or a column, with every two pairs of first battery cells 1115 spaced by one pair of second battery cells 1116, that is, arrangement units, each including two first battery cells 1115 and two second battery cells 1116, are arranged in a row or a column. It may be understood that values of n and m may alternatively be other values. This is not enumerated herein.

In some embodiments, the first battery cell 1115 is provided in a quantity of at least two, and the pressure relief mechanisms 1111 of two adjacent first battery cells 1115 are disposed facing the different discharge channels 112 respectively. Therefore, the different first battery cells 1115 can discharge emissions through the different discharge channels 112 respectively, so that emissions from the first battery cells 1115 can be effectively discharged out of the battery 11 in a timely manner. In addition, a probability that thermal failure of one first battery cell 1115 causes thermal failure of the second battery cell 1116 can be effectively reduced, thereby helping relieve chain reaction of thermal failure and improving use safety of the battery 11.

In some other implementations, the second battery cell 1116 is provided in a quantity of at least two, and the pressure relief mechanisms 1111 of two adjacent second battery cells 1116 are disposed facing the different discharge channels 112 respectively. Therefore, the different second battery cells 1116 can discharge emissions through the different discharge channels 112 respectively, so that emissions from the second battery cells 1116 can be effectively discharged out of the battery 11 in a timely manner.

In addition, in some other implementations, the quantity of the at least two discharge channels 112 is two, all pressure relief mechanisms 1111 of the first battery cells 1115 communicate with one of the discharge channels 112, and all pressure relief mechanisms 1111 of the second battery cells 1116 communicate with another of the discharge channels 112. In this case, two discharge channels 112 spaced apart from each other can be arranged on the bottom wall 1131 for example. For example, the first battery cells 1115 and the second battery cells 1116 are arranged in a column, and the first battery cells 1115 and the second battery cells 1116 may have substantially the same length and width, and may have the same thickness or different thicknesses. In addition, a distance from the pressure relief mechanism 1111 on the first battery cell 1115 to a side edge of the first battery cell 1115 is one fourth of the width of the first battery cell 1115, and a distance from the pressure relief mechanism 1111 on the second battery cell 1116 to a side edge of the second battery cell 1116 is one fourth of the width of the second battery cell 1116. The pressure relief mechanism 1111 of the first battery cell 1115 and the pressure relief mechanism 1111 of the second battery cell 1116 are not collinear, that is, the pressure relief mechanism 1111 on the first battery cell 1115 and the pressure relief mechanism 1111 on the second battery cell 1116 are staggered in an arrangement direction of the first battery cell 1115 and the second battery cell 1116. Therefore, the pressure relief mechanisms 1111 on the first battery cells 1115 are disposed facing one discharge channel 112 on the bottom wall 1131, and the pressure relief mechanisms 1111 on the second battery cells 1116 are disposed facing another discharge channel 112 on the bottom wall 1131, so that when internal pressure or temperature of the first battery cell 1115 reaches a threshold, emissions in the first battery cell 1115 are discharged through one of the discharge channels 112, and when internal pressure or temperature of the second battery cell 1116 reaches a threshold, emissions in the second battery cell 1116 are discharged through one of the discharge channels 112, so that the emissions from the first battery cell 1115 and the second battery cells 1116 can all be effectively discharged out of the battery 11 in a timely manner, thereby improving use safety of the battery 11.

Figure 11:
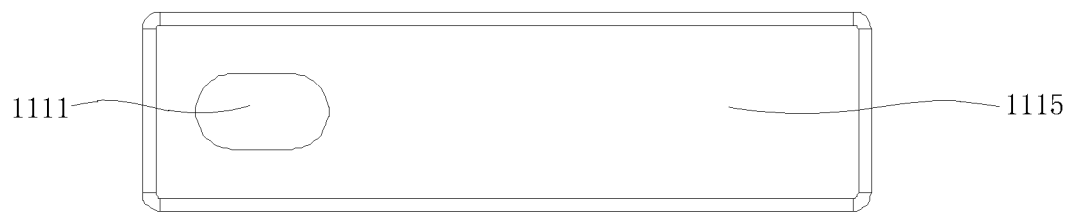
FIG. 11 is a schematic structural diagram of a first battery cell according to an embodiment of this application.
Figure 12:
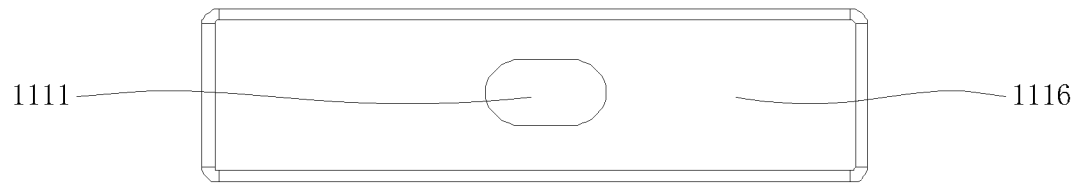
FIG. 12 is a schematic structural diagram of a second battery cell according to an embodiment of this application.

Certainly, in an alternative implementation of the foregoing implementation, as shown in FIG. 11 and FIG. 12, a distance from the pressure relief mechanism 1111 on the first battery cell 1115 to a side edge of the first battery cell 1115 may be one fourth of the width of the first battery cell 1115, and a distance from the pressure relief mechanism 1111 on the second battery cell 1116 to a side edge of the second battery cell 1116 may be half of the width of the second battery cell 1116. In this case, the pressure relief mechanism 1111 on the first battery cell 1115 and the pressure relief mechanism 1111 on the second battery cell 1116 are also not collinear.

Certainly, in some other implementations, a total quantity of the first battery cells 1115 can be greater than or equal to two, and a quantity of the at least two discharge channels 112 is three, and one discharge channel 112 is located between the other two discharge channels 112. The pressure relief mechanisms 1111 on any two adjacent first battery cells 1115 can communicate with two of the discharge channels 112 respectively, and the pressure relief mechanism 1111 of the second battery cell 1116 can communicate with another discharge channel 112. Further, any two adjacent first battery cells 1115 can communicate with the discharge channels 112 on two sides, and the pressure relief mechanism 1111 of the second battery cell 1116 can communicate with the discharge channel 112 in the middle.

Alternatively, in some embodiments, the disposed at least two discharge channels 112 can both be made to communicate with the first battery cells 1115, and the pressure relief mechanisms 1111 on two adjacent first battery cells 1115 can communicate with different discharge channels 112 respectively, and the second battery cell 1116 has no discharge channel 112 disposed facing it.

As shown in FIG. 10, in the battery 11 in this application, in some embodiments, a first thermal insulation member 114 is disposed between two adjacent first battery cells 1115. When thermal failure occurs in one of the first battery cells 1115, the first battery cell 1115 adjacent to the first battery cell 1115 already in thermal failure can be effectively prevented by the first thermal insulation member 114 from thermal failure. In some embodiments, a second thermal insulation member 115 is further disposed between adjacent second battery cells 1116. When thermal failure occurs in one of the second battery cells 1116, the second battery cell 1116 adjacent to the second battery cell 1116 already in thermal failure can be effectively prevented by the second thermal insulation member 115 from thermal failure. In some embodiments, a third thermal insulation member 116 is further disposed between the first battery cell 1115 and the second battery cell 1116 that are adjacent. When thermal failure occurs in one of the first battery cells 1115, the second battery cell 1116 adjacent to the first battery cell 1115 in thermal failure can be effectively prevented by the third thermal insulation member 116 from thermal failure, and vice versa. In some embodiments, at least one of the first thermal insulation member 114, the second thermal insulation member 115, and the third thermal insulation member 116 is included in the battery 11. In some embodiments, the first thermal insulation member 114, the second thermal insulation member 115, and the third thermal insulation member 116 may be at least one of foam, rubber, thermal insulation wool, or aerogel thermal insulation pad. In some embodiments, the first thermal insulation member 114, the second thermal insulation member 115, and the third thermal insulation member 116 may be constructed as a square frame structure. Further, the first thermal insulation member 114, the second thermal insulation member 115, and the third thermal insulation member 116 further include a filling member, configured to fill a hollow part of the square frame, where the filling member is elastic, and the filling member is selected from at least one of foam, rubber, thermal insulation wool, or aerogel thermal insulation pad.

In some embodiments, an area of the pressure relief mechanism 1111 of the first battery cell 1115 is greater than an area of the pressure relief mechanism 1111 of the second battery cell 1116. It should be noted that in such implementations, energy density of the first battery cell 1115 is usually greater than energy density of the second battery cell 1116. Therefore, even though thermal failure reaction of the first battery cell 1115 is more violent, the first battery cell 1115 can discharge emissions out of the battery 11 in a timely manner through the pressure relief mechanism 1111 of the first battery cell 1115 with a larger area. In this case, the second battery cell 1116 can also discharge emissions out of the battery 11 in a timely manner through the pressure relief mechanism 1111 of the second battery cell 1116, improving use safety of the battery 11. In some embodiments, a ratio of an area $A_1$ of a first pressure relief mechanism 1111 to an area $A_2$ of a second pressure relief mechanism 1111 satisfies: $1.5 \leq A_1/A_2 \leq 4$.

It should be noted that in some embodiments, the battery 11 further includes a thermal management component 117, configured to accommodate fluid to adjust temperatures of the battery cells 111. The thermal management component 117 is disposed between the battery cells 111 and at least one wall. With arrangement of the thermal management component 117, the thermal management component 117 is restricted to be disposed between the battery cells 111 and at least one wall, temperatures of the battery cells 111 can be adjusted, so that the battery cells 111 can be more efficiently and safely charged and discharged. The fluid herein may be liquid or gas. To adjust temperatures means to heat or cool the battery cells 111. In a case of cooling down or lowering the temperatures of the battery cells 111, the thermal management component 117 is configured to accommodate a cooling fluid to lower the temperatures of the battery cells 111. In this case, the thermal management component 117 may also be called as a cooling component, a cooling system, a cooling plate, or the like, and the fluid accommodated therein may also be called as a cooling medium or cooling fluid, and more specifically, may be called as a cooling liquid or cooling gas. In addition, the thermal management component 117 may also be configured to accommodate heating fluid to raise temperatures of the battery cells 111. This is not limited in the embodiments of this application. In some embodiments, the fluid may circulate, to implement a better temperature adjustment effect. In some embodiments, the fluid may be water, mixed liquid of water and glycol, air, or the like.

The thermal management component 117 is configured to be broken (damaged or ruptured) when the pressure relief mechanism 1111 is actuated, to allow the fluid to flow out. To be specific, with the thermal management component 117, when internal pressure or temperature of the battery cell 111 reaches a threshold and a high-temperature and high-pressure gas needs to be released, emissions released by the battery cell 111 act on the thermal management component 117 to break the thermal management component 117, so that the emissions from the battery cell 111 can enter the discharge channel 112 (that is, the hollow cavity of the box body 113) via the damaged thermal management component 117. In addition, because the thermal management component 117 is broken, the outflowing fluid such as cooling liquid absorbs a large amount of heat and is evaporated, rapidly lowering internal temperature of the battery 11, thereby helping relieve chain reaction of thermal failure, and improving use safety of the battery 11.

For example, as shown in FIG. 5, the thermal management component 117 is, for example, a water-cooled plate, a fluid channel is provided in the water-cooled plate, one end of the fluid channel forms a water inlet, and the other end of the water flow channel forms a water outlet. When the battery cells 111 operate properly, water temperature in the water-cooled plate is adjusted to adjust temperatures of the battery cells 111, so that the battery cells 111 are charged and discharged within an appropriate temperature range, thereby improving charging efficiency and discharging efficiency of the battery 11. When thermal failure occurs in a battery cell 111, internal pressure released by the battery cell 111 breaks the water-cooled plate, so that water in the water-cooled plate is evaporated to absorb heat of high-temperature gases released by the battery cell 111, further reducing the probability of combustion and explosion of the battery cell 111, and improving use safety of the battery 11.

In some embodiments, a second through-hole 1171 is provided in the thermal management component 117, and the second through-hole 1171 is configured to be capable of communicating with the discharge channel 112, so that when the pressure relief mechanism 1111 is actuated, the emissions from the battery cell 111 enter the discharge channel 112 via the second through-hole 1171. In some embodiments, an area of the second through-hole 1171 may be set to be greater than or equal to an area of the pressure relief mechanism 1111 disposed on the battery cell 111. Therefore, when internal pressure or temperature of the battery cell 111 reaches a threshold, the pressure relief mechanism 1111 of the battery cell 111 is actuated, and the emissions in the battery cell 111 are discharged, the discharged emissions of the battery cell 111 can rapidly and smoothly enter the discharge channel 112 (that is, the hollow cavity of the box body 113) via the second through-hole 1171, so that the emissions in the battery cell 111 can be effectively discharged into the discharge channel 112 in a timely manner. Further, a first through-hole 1133 is provided in at least one wall of the box body 113, and the first through-hole 1133 is configured to communicate with the discharge channel 112. In this case, the second through-hole 1171 communicates with the discharge channel 112 via the first through-hole 1133. The emissions released by the battery cell 111 enter the discharge channel 112 (that is, the hollow cavity of the box body 113) via the second through-hole 1171 and the first through-hole 1133 in sequence. In this way, the emissions in the battery cell 111 can be effectively discharged into the discharge channel 112 in a timely manner.

Figure 13:
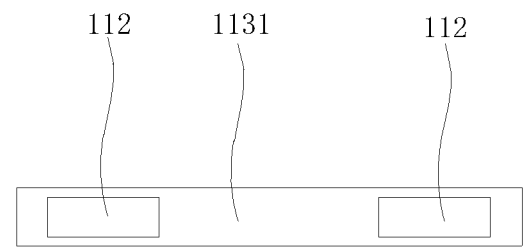
FIG. 13 is a first schematic structural diagram of a bottom wall according to an embodiment of this application.
Figure 14:
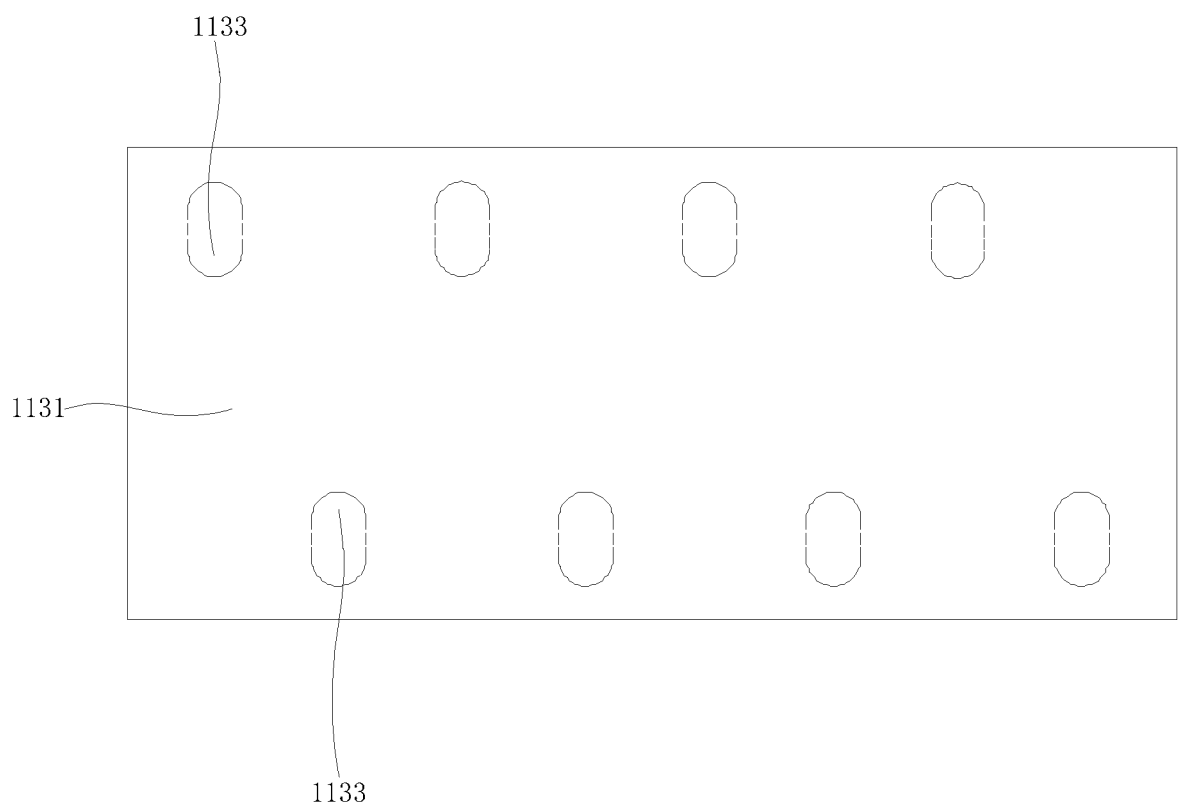
FIG. 14 is a second schematic structural diagram of a bottom wall according to an embodiment of this application.
Figure 15:
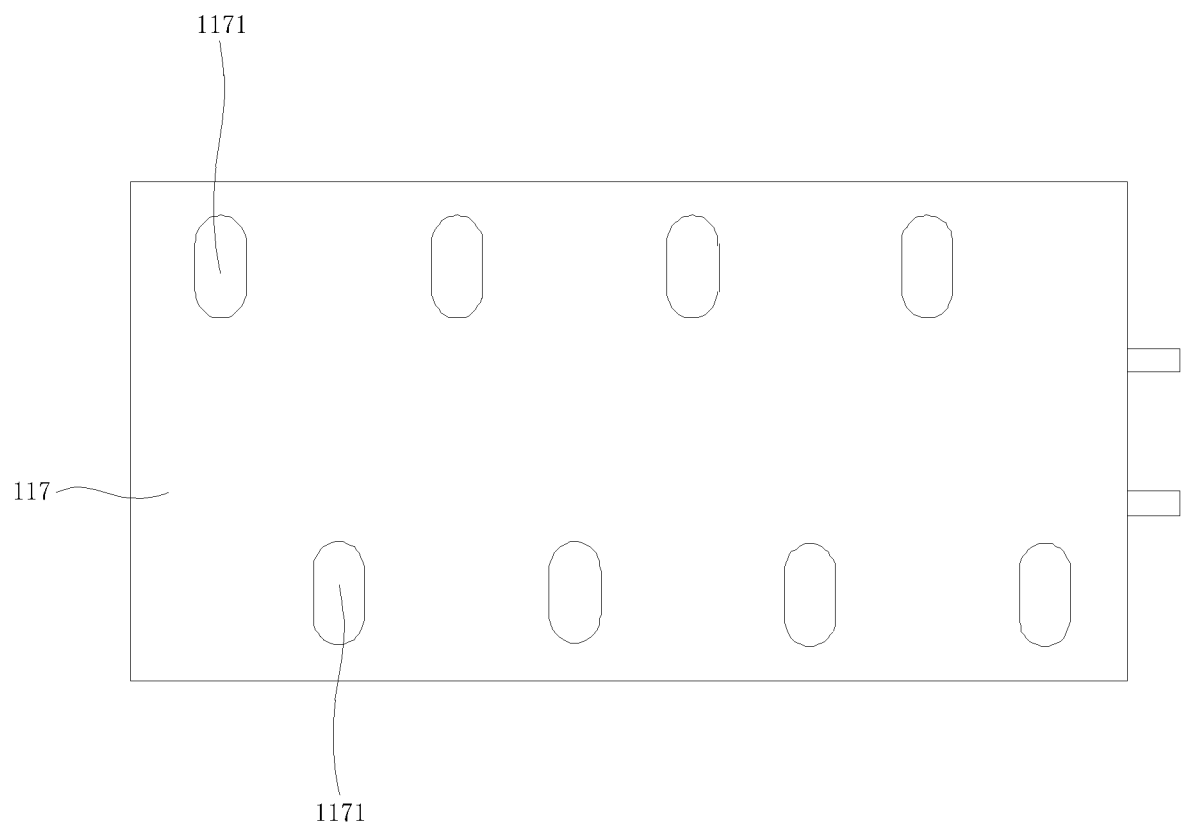
FIG. 15 is a schematic structural diagram of a thermal management component according to an embodiment of this application.

It should be noted that, in the foregoing implementation, the second through-holes 1171 need to be in one-to-one correspondence with the first through-holes 1133. For example, two discharge channels 112 are provided in a bottom wall 1131 shown in FIG. 13, a plurality of first through-holes 1133 communicating with two discharge channels 112 are provided in a bottom wall 1131 shown in FIG. 14, and correspondingly, a plurality of second through-holes 1171 in one-to-one correspondence with the first through-holes 1133 are provided in a thermal management component 117 shown in FIG. 15.

The foregoing has described the battery 11 in the embodiments of this application with reference to FIG. 1 to FIG. 15. The following will describe a preparation method and device of battery 11 in the embodiments of this application. For the parts that are not described in detail, reference may be made to the foregoing embodiments.

An embodiment of this application provides a preparation method of battery 11, including the following steps:

configuring at least two battery cells 111, where the at least two battery cells 111 each include a pressure relief mechanism 1111, and the pressure relief mechanism 1111 is configured to be actuated when internal pressure or temperature in the battery cell 111 reaches a threshold, to release the internal pressure; and configuring at least two discharge channels 112, where the discharge channels 112 are spaced apart from each other and disposed facing the pressure relief mechanisms 1111, and the at least two discharge channels 112 are configured to collect emissions respectively from the corresponding battery cell 111 when the pressure relief mechanism 1111 is actuated.

In the preparation method of battery provided in this embodiment, at least two battery cells 111 and at least two discharge channels 112 are configured, and the at least two discharge channels 112 are configured to collect emissions respectively from the corresponding battery cell 111 when the pressure relief mechanism 1111 of the battery cell 111 is actuated. In this way, when internal pressures or temperatures of the battery cells 111 reach the threshold, the emissions in the at least two battery cells 111 can be discharged through different discharge channels 112, the emissions in the battery cells 111 can be efficiently discharged in a timely manner, so as to effectively reduce the probability that the discharge channel 112 is blocked by solid substances discharged from the battery cell 111, thereby improving use safety of the battery 11.

An embodiment of this application provides a preparation apparatus of battery 11, including:

a battery cell configuration module, configured to configure at least two battery cells 111, where the at least two battery cells 111 each include a pressure relief mechanism 1111, and the pressure relief mechanism 1111 is configured to be actuated when internal pressure or temperature in the battery cell 111 reaches a threshold, to release the internal pressure; and a discharge channel configuration module, configured to configure at least two discharge channels 112, where the discharge channels 112 are spaced apart from each other and disposed facing the pressure relief mechanisms 1111, and the at least two discharge channels 112 are configured to collect emissions respectively from the corresponding battery cell 111 when the pressure relief mechanism 1111 is actuated.

In the preparation apparatus of battery 11 provided in this embodiment, a battery cell configuration module is configured to configure at least two battery cells 111, a discharge channel configuration module is configured to configure at least two discharge channels 112, and the at least two discharge channels 112 are configured to collect emissions respectively from the corresponding battery cell 111 when the pressure relief mechanism 1111 of the battery cell 111 is actuated. In this way, when internal pressures or temperatures of the battery cells 111 reach the threshold, the emissions in the at least two battery cells 111 can be discharged through different discharge channels 112, the emissions in the battery cells 111 can be efficiently discharged in a timely manner, so as to effectively reduce the probability that the discharge channel 112 is blocked by solid substances discharged from the battery cell 111, thereby improving use safety of the battery 11.

The preparation apparatus of battery in this embodiment may be applied to the preparation method for battery 11 in the foregoing embodiment. That is, the preparation method of battery in the foregoing embodiment may be specifically implemented by using the preparation apparatus of battery 11 in this embodiment.

In conclusion, in the battery 11, the apparatus, the preparation method of battery, and the preparation apparatus of battery provided in this application, at least two discharge channels 112 are configured to collect emissions respectively from the corresponding battery cell 111 when the pressure relief mechanism 1111 of the battery cell 111 is actuated, so that the emissions in at least two battery cells 111 can be discharged through different discharge channels 112, the emissions in the battery cells 111 can be efficiently discharged in a timely manner, so as to effectively reduce the probability that the discharge channel 112 is blocked by solid substances discharged from the battery cell 111, thereby improving use safety of the battery 11.

The embodiments or implementations in this specification are described in a progressive manner, each embodiment focuses on the difference from other embodiments, and the same and similar parts between the embodiments may refer to each other.

In the description of this specification, reference to the description of the terms "an implementation", "some implementations", "an example of the implementation", "an example", "a specific example", or "some examples" means that particular features, structures, materials or characteristics described in connection with the implementations or examples are included in at least one implementation or example of this application. In this specification, descriptions of examples of the above terms do not necessarily refer to the same implementation or example. Furthermore, the particular features, structures, materials, or characteristics described may be combined in a suitable manner in any one or more implementations or examples.

In conclusion, it should be noted that each foregoing embodiment is merely intended for describing the technical solutions of this application but not for limiting this application. Although this application is described in detail with reference to each foregoing embodiment, persons of ordinary skill in the art should understand that they may still make modifications to the technical solutions described in each foregoing embodiment or make equivalent replacements to some or technical features thereof, without departing from the scope of the technical solutions of each embodiment of this application.

What is claimed is:

1. A battery, comprising:
    two battery cells, wherein the two battery cells each comprise a pressure relief mechanism, and the pressure relief mechanism is configured to be actuated when internal pressure or temperature in the battery cell reaches a threshold, to release the internal pressure, and the pressure relief mechanism is located at a bottom of the battery cell;
    two discharge channels, wherein the discharge channels are spaced apart from each other and disposed facing the pressure relief mechanisms, and the two discharge channels are configured to collect emissions respectively from the corresponding battery cell when the pressure relief mechanism is actuated;
    a box body having a bottom wall, a hollow cavity being provided in the bottom wall and configured to form the two discharge channels; and
    a thermal management component, configured to accommodate fluid to adjust temperatures of the battery cells, wherein the thermal management component is disposed between the battery cell and the bottom wall, and the thermal management component is configured to be broken when the pressure relief mechanism is actuated, to cause the fluid to flow out.

2. The battery according to claim 1, wherein the two battery cells comprise a first battery cell and a second battery cell adjacent to each other, and a pressure relief mechanism of the first battery cell and a pressure relief mechanism of the second battery cell are disposed respectively facing different discharge channels.

3. The battery according to claim 2, wherein energy density of the first battery cell is greater than energy density of the second battery cell.

4. The battery according to claim 2, wherein the first battery cell and the second battery cell are alternately arranged in an arrangement of n first battery cells and m second battery cells, wherein n≥1, and m≥1.

5. The battery according to claim 2, wherein the battery includes at least two first battery cells, and the pressure relief mechanisms of two adjacent first battery cells are disposed facing the different discharge channels respectively; and/or
    the battery includes at least two second battery cells, and the pressure relief mechanisms of two adjacent second battery cells are disposed facing the different discharge channels respectively.

6. The battery according to claim 5, wherein a first thermal insulation member is disposed between two adjacent first battery cells, and/or a second thermal insulation member is disposed between two adjacent second battery cells.

7. The battery according to claim 2, wherein a third thermal insulation member is disposed between the first battery cell and the adjacent second battery cell.

8. The battery according to claim 2, wherein an area of the pressure relief mechanism of the first battery cell is greater than an area of the pressure relief mechanism of the second battery cell.

9. The battery according to claim 2, wherein the box body has a plurality of walls comprising the bottom wall, the plurality of walls are configured to enclose an accommodating cavity for accommodating the battery cells.

10. The battery according to claim 1, wherein the bottom wall is configured to support the battery cells.

11. The battery according to claim 1, wherein the bottom wall is configured to be broken when the pressure relief mechanism is actuated, to cause the emissions from the battery cell to pass through the bottom wall and enter the discharge channel.

12. The battery according to claim 1, wherein a first through-hole is provided in the bottom wall, and the first through-hole is configured to communicate with the discharge channel, so that when the pressure relief mechanism is actuated, the emissions from the battery cell enter the discharge channel via the first through-hole.

13. The battery according to claim 12, wherein a second through-hole is provided in the thermal management component, and the second through-hole is configured to communicate with the discharge channel, so that when the pressure relief mechanism is actuated, the emissions from the battery cell enter the discharge channel via the second through-hole.

14. The battery according to claim 13, wherein the second through-hole communicates with the discharge channel via the first through-hole.

15. An apparatus, characterized by comprising the battery according to claim 1, wherein the battery is configured to provide electric energy.

16. A preparation method of battery, comprising:
    configuring two battery cells, wherein the two battery cells each comprise a pressure relief mechanism, and the pressure relief mechanism is configured to be actuated when internal pressure or temperature in the battery cell reaches a threshold, to release the internal pressure, and the pressure relief mechanism is located at a bottom of the battery cell;
    configuring two discharge channels, wherein the discharge channels are spaced apart from each other and disposed facing the pressure relief mechanisms, and the two discharge channels are configured to collect emissions respectively from the corresponding battery cell when the pressure relief mechanism is actuated;

configuring a box body having a bottom wall, a hollow cavity being provided in the bottom wall and configured to form the two discharge channels; and configuring a thermal management component, wherein the thermal management component is configured to accommodate fluid to adjust temperatures of the battery cells, wherein the thermal management component is disposed between the battery cell and the bottom wall, and the thermal management component is configured to be broken when the pressure relief mechanism is actuated, to cause the fluid to flow out.

17. A manufacturing apparatus of batteries, comprising:

a battery cell configuration module that configures two battery cells, wherein the two battery cells each comprise a pressure relief mechanism, and the pressure relief mechanism is configured to be actuated when internal pressure or temperature in the battery cell reaches a threshold, to release the internal pressure, and the pressure relief mechanism is located at a bottom of the battery cell;

a discharge channel configuration module that configures two discharge channels, wherein the discharge channels are spaced apart from each other and disposed facing the pressure relief mechanisms, and the two discharge channels are configured to collect emissions respectively from the corresponding battery cell when the pressure relief mechanism is actuated;

a box body configuration module that configures a box body having a bottom wall, a hollow cavity being provided in the bottom wall and configured to form the two discharge channels; and a thermal management component configuration module that configures a thermal management component, wherein the thermal management component is configured to accommodate fluid to adjust temperatures of the battery cells, wherein the thermal management component is disposed between the battery cell and the bottom wall, and the thermal management component is configured to be broken when the pressure relief mechanism is actuated, to cause the fluid to flow out.

* * * * *